(12) United States Patent  
Liu et al.

(10) Patent No.: US 12,141,993 B2
(45) Date of Patent: Nov. 12, 2024

(54) METHOD AND DEVICE FOR SIMULTANEOUS LOCALIZATION AND MAPPING (SLAM)

(71) Applicant: SAMSUNG ELECTRONICS CO., LTD., Suwon-si (KR)

(72) Inventors: Zhihua Liu, Beijing (CN); Donghoon Sagong, Suwon-si (KR); Hongseok Lee, Seoul (KR); Qiang Wang, Beijing (CN); Yuntae Kim, Suwon-si (KR); Kuan Ma, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 17/536,432

(22) Filed: Nov. 29, 2021

(65) Prior Publication Data

US 2022/0172386 A1    Jun. 2, 2022

(30) Foreign Application Priority Data

Nov. 27, 2020 (CN) .......................... 202011357045.6
Nov. 26, 2021 (KR) .......................... 10-2021-0165675

(51) Int. Cl.
 *G06T 7/579* (2017.01)
 *G06T 7/73* (2017.01)
 *G06T 7/77* (2017.01)

(52) U.S. Cl.
 CPC .............. *G06T 7/579* (2017.01); *G06T 7/73* (2017.01); *G06T 7/77* (2017.01); *G06T 2207/10028* (2013.01); *G06T 2207/20081* (2013.01); *G06T 2207/30244* (2013.01)

(58) Field of Classification Search
 CPC .. G06T 7/579; G06T 7/73; G06T 7/77; G06T 2207/10028; G06T 2207/20081; G06T 2207/30244; G06T 2207/20084; G06V 10/74; G06V 10/774; G06V 10/82; G06V 20/56
 USPC .................. 382/154, 103, 285; 700/253, 245
 See application file for complete search history.

(56) References Cited

U.S. PATENT DOCUMENTS

| 9,830,701 | B2* | 11/2017 | Zhang | .......................... G06T 7/593 |
| 2012/0306847 | A1* | 12/2012 | Lim | .......................... G06T 7/579 |
| | | | | 345/418 |
| 2014/0320593 | A1* | 10/2014 | Pirchheim | ............ H04N 13/289 |
| | | | | 348/36 |

(Continued)

FOREIGN PATENT DOCUMENTS

KR    10-2006-0023313 A     3/2006

OTHER PUBLICATIONS

Y. Fan et al., "Semantic SLAM With More Accurate Point Cloud Map in Dynamic Environments," in IEEE Access, vol. 8, pp. 112237-112252, 2020. (Year: 2020).*

(Continued)

*Primary Examiner* — Kathleen Y Dulaney
(74) *Attorney, Agent, or Firm* — Sughrue Mion, PLLC

(57) ABSTRACT

Provided is a method for simultaneous localization and mapping (SLAM), the method including obtaining a current frame image input through a camera, performing scene recognition on the current frame image to obtain a key frame image having a greatest similarity to the current frame image in a global map, and obtaining a camera pose of the current frame image based on the key frame image.

18 Claims, 15 Drawing Sheets

(56) References Cited

U.S. PATENT DOCUMENTS

| | | | |
|---|---|---|---|
| 2018/0211399 A1* | 7/2018 | Lee | G06T 7/529 |
| 2019/0073787 A1* | 3/2019 | Lee | G06T 11/60 |
| 2019/0234746 A1* | 8/2019 | Zhang | G06T 7/73 |
| 2019/0379819 A1 | 12/2019 | Shimada | |
| 2020/0110966 A1* | 4/2020 | Revaud | G06T 7/73 |
| 2020/0193623 A1* | 6/2020 | Liu | G06N 3/04 |
| 2020/0218929 A1* | 7/2020 | Li | G06V 20/10 |
| 2020/0219268 A1* | 7/2020 | Liu | G06V 10/25 |
| 2020/0240793 A1* | 7/2020 | Li | G01C 21/12 |
| 2020/0334841 A1* | 10/2020 | Cristobal | G06T 7/74 |
| 2020/0334842 A1* | 10/2020 | Michielin | G06T 15/10 |
| 2020/0349730 A1* | 11/2020 | Chen | G06T 7/579 |
| 2021/0042996 A1* | 2/2021 | Das | G06T 7/75 |
| 2021/0133480 A1* | 5/2021 | Rus | G06F 16/587 |
| 2021/0150755 A1* | 5/2021 | Gao | G06T 7/73 |
| 2021/0272313 A1* | 9/2021 | Wang | G06F 18/22 |
| 2022/0138979 A1* | 5/2022 | Adkinson | G06T 7/62 345/633 |
| 2022/0164981 A1* | 5/2022 | Fujisawa | G06V 10/761 |
| 2022/0172386 A1* | 6/2022 | Liu | G06T 7/73 |
| 2022/0287530 A1* | 9/2022 | Xi | G06V 20/64 |

OTHER PUBLICATIONS

R. Mur-Artal, J. M. M. Montiel and J. D. Tardós, "ORB-SLAM: A Versatile and Accurate Monocular SLAM System," in IEEE Transactions on Robotics, vol. 31, No. 5, pp. 1147-1163, Oct. 2015, doi: 10.1109/TRO.2015.2463671. (Year: 2015).*

J. Stückler and S. Behnke, "Integrating depth and color cues for dense multi-resolution scene mapping using RGB-D cameras," 2012 IEEE International Conference on Multisensor Fusion and Integration for Intelligent Systems (MFI), Hamburg, Germany, 2012, pp. 162-167, (Year: 2012).*

Z. Su, X. Zhou, T. Cheng, H. Zhang, B. Xu and W. Chen, "Global localization of a mobile robot using lidar and visual features," 2017 IEEE International Conference on Robotics and Biomimetics (ROBIO), Macau, Macao, 2017, pp. 2377-2383 (Year: 2017).*

Y. Liu, Y. Petillot, D. Lane and S. Wang, "Global Localization with Object-Level Semantics and Topology," 2019 International Conference on Robotics and Automation (ICRA), Montreal, QC, Canada, 2019, pp. 4909-4915. (Year: 2019).*

J. Ventura, C. Arth, G. Reitmayr and D. Schmalstieg, "Global Localization from Monocular SLAM on a Mobile Phone," in IEEE Transactions on Visualization and Computer Graphics, vol. 20, No. 4, pp. 531-539, Apr. 2014. (Year: 2014).*

C.-W. Chen, W.-Y. Hsiao, T.-Y. Lin, J. Wang and M.-D. Shieh, "Fast Keyframe Selection and Switching for ICP-based Camera Pose Estimation," 2018 IEEE International Symposium on Circuits and Systems (ISCAS), Florence, Italy, 2018, pp. 1-4. (Year: 2018).*

L. Ding and C. Feng, "DeepMapping: Unsupervised Map Estimation From Multiple Point Clouds," 2019 IEEE/CVF Conference on Computer Vision and Pattern Recognition (CVPR), Long Beach, CA, USA, 2019, pp. 8642-8651. (Year: 2019).*

Q. Tian, Y. Gao, G. Li and J. Song, "A Novel Global Relocalization Method Based on Hierarchical Registration of 3D Point Cloud Map for Mobile Robot," 2019 5th International Conference on Control, Automation and Robotics (ICCAR), Beijing, China, 2019, pp. 68-73. (Year: 2019).*

Kuse et al., "Learning Whole-Image Descriptors for Real-time Loop Detection and Kidnap Recovery under Large Viewpoint Difference," arXiv:1904.06962v1 [cs.RO], Apr. 2019, Total 39 pages.

Tian et al., "Contrastive Multiview Coding," arXiv:1906.05849v5 [cs.CV], Dec. 2020, total 16 pages.

He et al., "Momentum Contrast for Unsupervised Visual Representation Learning," arXiv:1911.05722v2 [cs.CV], Nov. 2019, Total 11 pages.

Sarlin et al., "SuperGlue: Learning Feature Matching with Graph Neural Networks," CVPR 2020 paper, pp. 4938-4947, 2020.

* cited by examiner

METHOD AND DEVICE FOR SIMULTANEOUS LOCALIZATION AND MAPPING (SLAM)

CROSS-REFERENCE TO RELATED APPLICATION

This application claims the benefit of Chinese Patent Application No. 202011357045.6, filed on Nov. 27, 2020 in the China National Intellectual Property Administration, and Korean Patent Application No. 10-2021-0165675, filed on Nov. 26, 2021 in the Korean Intellectual Property Office, the disclosures of which are incorporated herein in their entireties by reference.

BACKGROUND

1. Field

Example embodiments of the present disclosure relate to a field of computer vision technology, and more particularly to a method and device for simultaneous localization and mapping (SLAM).

2. Description of Related Art

A simultaneous localization and mapping (SLAM) system may estimate a pose in real time and construct a three-dimensional scene at the same time by capturing inputs from various sensors (a laser radar such as a light detection and ranging (LIDAR), a camera, an inertial measurement unit (IMU), a global positioning system (GPS), a depth sensor (Kinect), or the like), which is widely used in the fields of autonomous driving, robot navigation, and augmented reality. A camera may obtain richer texture information and is not affected by distance, building occlusion, which is therefore being widely used in a SLAM system. Whether data association between two images may be found is related to the accuracy of camera tracking of a SLAM system, and it is also related to the robustness of tracking in the SLAM system. Scene recognition technology finds the most similar image by calculating the similarity between any two images, which may be used to find two images with possible consensus in a large-scale scene and used in subsequent feature point matching, and plays an important role in loop-closure detection and re-localization in the SLAM system.

SUMMARY

One or more example embodiments provide a method and device for simultaneous localization and mapping (SLAM) to determine a camera pose through loop-closure detection and re-localization.

According to an aspect of an example embodiment, there is provided a method for simultaneous localization and mapping (SLAM), the method including obtaining a current frame image input through a camera, performing scene recognition on the current frame image to obtain a key frame image having a greatest similarity to the current frame image in a global map, and obtaining a camera pose of the current frame image based on the key frame image.

The obtaining of the camera pose of the current frame image based on the key frame image may include obtaining a feature point matching relationship between the current frame image and the key frame image, and obtaining the camera pose of the current frame image based on the feature point matching relationship between the current frame image and the key frame image.

The performing of the scene recognition on the current frame image may include obtaining a global descriptor of the current frame image, and inquiring the key frame image having the greatest similarity to the current frame image in the global map based on the global descriptor of the current frame image.

The inquiring of the key frame image having the greatest similarity to the current frame image in the global map based on the global descriptor of the current frame image may include obtaining a distance between a global descriptor of each key frame in the global map and the global descriptor of the current frame image, and obtaining a similarity between the global descriptor of the key frame image and the global descriptor of the current frame image based on the distance between the global descriptor of the key frame image and the global descriptor of the current frame image, wherein, as the distance between the global descriptor of the key frame image and the global descriptor of the current frame image decreases, the similarity between the key frame image and the current frame image increases.

The obtaining of the feature point matching relationship between the current frame image and the key frame image may include obtaining a local three-dimensional point cloud of the current frame image and a global three-dimensional point cloud of the key frame image, obtaining a scene structure of the current frame image and a scene structure of the key frame image based on the local three-dimensional point cloud of the current frame image and the global three-dimensional point cloud of the key frame image, and obtaining the feature point matching relationship between the current frame image and the key frame image based on the scene structure of the current frame image and the scene structure of the key frame image.

The obtaining of the local three-dimensional point cloud of the current frame image may include obtaining a two-dimensional feature point and a depth value of the current frame image, and converting the two-dimensional feature point and the depth value of the current frame image into the local three-dimensional point cloud of the current frame image based on a pose prior.

The obtaining of the global three-dimensional point cloud of the key frame image may include converting a two-dimensional feature point and a depth value of the key frame image into the global three-dimensional point cloud based on a camera pose of the key frame image.

The obtaining of the feature point matching relationship between the current frame image and the key frame image based on the scene structure of the current frame image and the key frame image may include performing encoding on each of the local three-dimensional point cloud and the global three-dimensional point cloud based on a three-dimensional position encoder to obtain a local high-dimensional feature and a global high-dimensional feature, obtaining a feature point descriptor of the current frame image and a feature point descriptor of the key frame image, and inputting the local high-dimensional feature and the global high-dimensional feature and the feature point descriptor of the current frame image and the feature point descriptor of the key frame image to a feature point matching network to obtain the feature point matching relationship between the current frame image and the key frame image.

The obtaining of the camera pose of the current frame image based on the feature point matching relationship between the current frame image and the key frame image may include obtaining the camera pose of the current frame image based on a local beam adjustment method or a global beam adjustment method, based on the feature point matching relationship between the current frame image and the key frame image.

The obtaining of the global descriptor of the current frame image may include obtaining the global descriptor of the current frame image through an intersection over union (IOU)-based image depth feature extraction network.

The method may further include performing training on the IOU-based image depth feature extraction network, wherein the training of the IOU-based image depth feature extraction network may include obtaining an anchor point image and a positive sample image from a training image, and performing training on the IOU-based image depth feature extraction network based on the anchor point image, the positive sample image, and a degree of similarity between the anchor point image and the positive sample image.

The obtaining of the anchor point image and the positive sample image from the training image may include performing random sampling to obtain the anchor point image from the training image, performing random sampling to obtain the degree of similarity between the anchor point image and the positive sample image, and performing sampling for an image in which a degree of similarity to the anchor point image is the obtained degree of similarity as the positive sample image.

The degree of similarity between the anchor point image and the positive sample image may be the IOU.

After obtaining the anchor point image and the positive sample image from the training image, the method may further include performing projective transformation on one or more of the anchor point image and the positive sample image.

According to another aspect of an example embodiment, there is provided a method for simultaneous localization and mapping (SLAM), the method including obtaining a current frame image input through a camera, obtaining a key frame image having a greatest similarity to the current frame image, obtaining a feature point matching relationship between the current frame image and the key frame image, and obtaining a camera pose of the current frame image based on the feature point matching relationship between the current frame image and the key frame image.

The obtaining of the feature point matching relationship between the current frame image and the key frame image may include obtaining a local three-dimensional point cloud of the current frame image and a global three-dimensional point cloud of the key frame image, obtaining a scene structure of the current frame image and a scene structure of the key frame image based on the local three-dimensional point cloud of the current frame image and the global three-dimensional point cloud of the key frame image, and obtaining the feature point matching relationship between the current frame image and the key frame image based on the scene structure of the current frame image and the key frame image.

According to another aspect of an example embodiment, there is provided a device for simultaneous localization and mapping (SLAM), the device including at least one processor configured to obtain a current frame image input through a camera, perform scene recognition on the current frame image to obtain a key frame image having a greatest similarity to the current frame image in a global map, and obtain a camera pose of the current frame image based on the key frame image.

According to another aspect of an example embodiment, there is provided a device for simultaneous localization and mapping (SLAM), the device including at least one processor configured to obtain a current frame image input through a camera, obtain a key frame image having a greatest similarity to the current frame image, obtain a feature point matching relationship between the current frame image and the key frame image, and obtain a camera pose of the current frame image based on the feature point matching relationship between the current frame image and the key frame image.

A computer-readable storage medium storing a computer program thereon, wherein, when the computer program may be executed by a processor to implement the method for SLAM.

A computing device may include at least one processor, and at least one memory configured to store a computer program, wherein, the computer program may be executed by the at least one processor to implement the method for simultaneous localization and mapping (SLAM).

BRIEF DESCRIPTION OF THE DRAWINGS

The above and/or other purposes and features of example embodiments will become apparent from the following description, taken in conjunction with the accompanying drawings in which:

FIG. 3 is a flowchart of a training iteration operation of an intersection over union (IOU)-based image depth feature extraction network according to an example embodiment of the;

DETAILED DESCRIPTION

Figure 1:
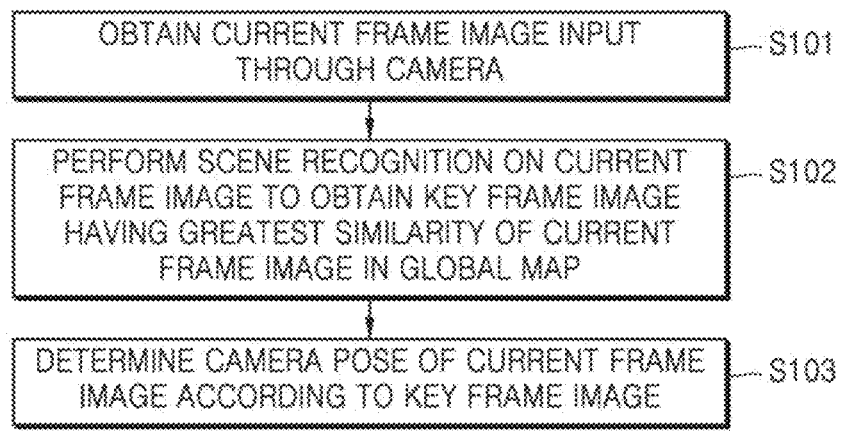
FIG. 1 is a flowchart of a method for simultaneous localization and mapping (SLAM) according to an example embodiment.

Reference will now be made in detail to example embodiments of the present disclosure, and the example embodiments are shown in the accompanying drawings, in which the same reference numerals always refer to the same components. The embodiments will be described below with reference to the drawings in order to explain the present disclosure.

At present, the scene recognition technology extracts related oriented FAST and rotated BRIEF (ORB) feature points and binary robust independent elementary features (BRIEF) descriptors, finds common-view frames through a bag-of-words (BOW) model, and then filters out wrong matches between feature points extracted from two images through a ransom sample consensus (RANSAC) algorithm to obtain data association, which is limited by an influence of an expressive ability of a descriptor, an accuracy of finding similar frames is not high, and a wrong feature point match will also reduce an accuracy of an initial value-sensitive RANSAC algorithm. Based on global features learned by a deep learning network NetVLAD, there are domain adaptation problems, and a generalization ability is not good in new scenes. The most effective deep learning networks are SuperPoint and SuperGlue. First, feature points and descriptors are extracted through the SuperPoint network, and then a feature point match between two images is found by using a graph neural network through the SuperGlue network, thereby finally calculating a camera pose of a camera, which performs well in different scenarios.

However, a related method of calculating a camera pose by finding a similar frame through ORB+BRIER+BOW is limited by an expressive ability of the BRIEF descriptor, and often obtains an incorrect matching result, making an accuracy of BOW searching for similar frames not high, and an incorrect matching relationship provides an incorrect initial value for the initial value-sensitive RANSAC algorithm, which often may not find the matching relationship of feature points, and thus, a camera pose may not be recovered. Global features learned through a deep learning network NetVLAD method have domain adaptation problems, poor generalization ability in new scenarios, and a network structure and training method thereof have been surpassed by other current algorithms. The deep learning networks SuperPoint and SuperGlue may often obtain rich feature points and descriptor information through deep learning networks, and the SuperGlue network may find a matching relationship between two images through a graph neural network, but the SuperGlue network only uses two-dimensional (2D) coordinate information of a feature point, which ignores scene structure information, that is, a three-dimensional point cloud composed of three-dimensional (3D) coordinates corresponding to each feature point on an image. This may be easily obtained during an operation of the SLAM system, and is very helpful for feature point matching between frames.

Therefore, a hybrid SLAM system is needed, which may use related methods to quickly realize the SLAM function of the SLAM system, and may also provide loop-closure detection in an SLAM operation and obtain a camera pose by performing relocation and recovery when the tracking fails. This requires the system to have strong generalization capabilities, to be able to operate in different scenarios, and to make full use of the scene structure information recovered during the SLAM operation to help the SLAM system better restore the camera pose.

A purpose of the present disclosure is to find the most similar key frame in a global map constructed during the operation of the SLAM system through an image input by a camera as a common view frame to establish a feature point matching between the common view frame and the input image, and calculate and obtain a camera pose to provide more constraint information for loop-closure detection and re-localization of the SLAM system. As an aspect, an image obtained by the camera will use a key frame selection strategy to select key frames to construct a global map, and calculate the camera pose through a local beam adjustment method and a global beam adjustment method to realize SLAM of the SLAM system. According to another aspect, to obtain a deep learning network with strong generalization ability to obtain image depth features, an intersection over union (IOU)-related image depth feature extraction network through unsupervised training is provided, which constrains the similarity between the image depth features learned by the network by explicitly calculating a correlation between the input images, so that the unsupervised deep learning network may help the SLAM system find a key frame that is most similar to an inquiry frame from a global map. According to another aspect, for the SuperPoint+SuperGlue deep learning network structure, only the two-dimensional (2D) coordinate system of the feature points may be used and the three-dimensional (3D) coordinate information may be ignored. A feature point matching network based on the scene structure is provided, which converts the 3D coordinate information of the feature points into a point cloud to obtain the corresponding scene structure, and then send the same to the SuperGlue network together with the descriptor to learn the feature point matching relationship between the images. In addition, a matching relationship between the obtained feature points is used to recover a relative pose between the input image and the common view frame, which may be used in the local beam adjustment method and the global beam adjustment method for SLAM in the SLAM system.

Figure 2:
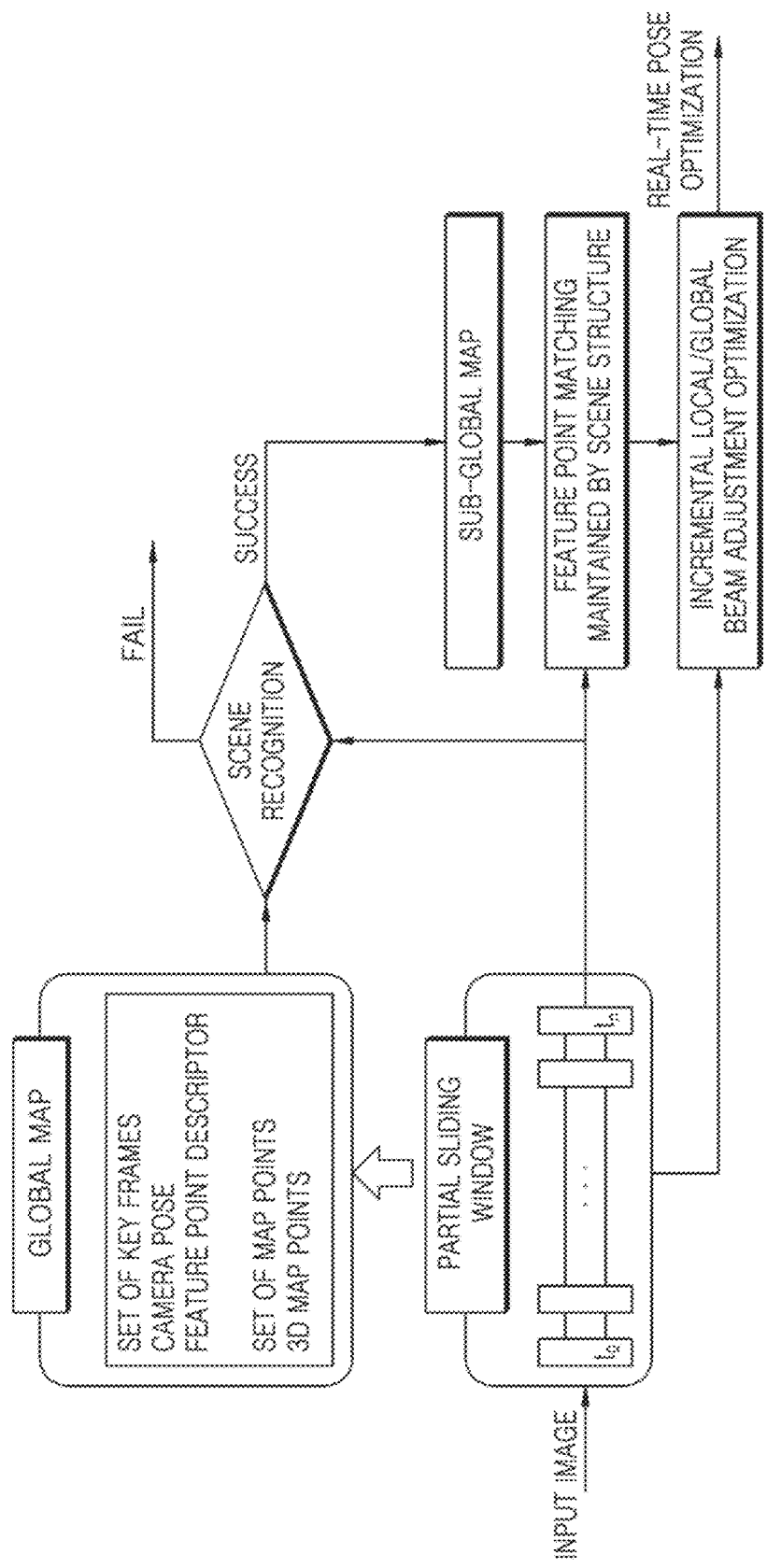
FIG. 2 shows a process of a method for SLAM according to an example embodiment.

FIG. 1 is a flowchart of a method for simultaneous localization and mapping (SLAM) according to an example embodiment. FIG. 2 shows a process of a method for SLAM according to an example embodiment. The method for SLAM according to example embodiments may be used in, for example, but not limited to, automatic driving, robot navigation, augmented reality and other application scenarios.

Referring to FIG. 1, in operation S101, a current frame image input through a camera is obtained.

In particular, in application scenarios such as autonomous driving, robot navigation, and augmented reality, a camera captures images in real time.

In operation S102, scene recognition is performed on the current frame image to obtain a key frame image having the greatest similarity to the current frame image in a global map.

In an example embodiment, when performing scene recognition of the current frame image, a global descriptor of the current frame image may be firstly obtained, and then the global map is inquired, based on the global descriptor of the current frame image, for the key frame image having the greatest similarity to the current frame image. Here, the key frame image is saved in the global map. As shown in FIG. 2, the global map may include a set of key frames and a set of map points. The set of key frames may include a camera pose and a feature point descriptor of each key frame image. The set of map points may include three-dimensional map points.

In the example embodiments, when the global map is inquired, based on the global descriptor of the current frame image, for a key frame image having the greatest similarity with the current frame image, a distance between a global descriptor of each key frame image in the global map and the global descriptor of the current frame image may be calculated. Then a similarity between the global descriptor of the key frame image and the global descriptor of the current frame image may be determined according to the distance between the global descriptor of the key frame image and the global descriptor of the current frame image. Here, as the distance between the global descriptor of the key frame image and the global descriptor of the current frame image decreases, the similarity between the key frame image and the current frame image increases.

In particular, when tracking and recognizing the current frame image, a key frame image that is the most similar to the current frame image may be searched in the global map as a common view frame image of the current frame image to perform scene recognition based on the common view frame image and restore a scene structure, thereby calculating a camera pose.

In an example embodiment, when obtaining the global descriptor of the current frame image, the global descriptor of the current frame image may be obtained through an IOU-based image depth feature extraction network.

In an example embodiment, the IOU-based image depth feature extraction network may also be trained.

A requirement for transforming an image into a feature vector through a deep learning network is to distinguish between positive samples and negative samples, and to ensure that a distance between the positive samples is constantly shortened and a distance between the negative samples is increased during a training operation, so that the distance between the positive samples is less than the distance between the negative samples, to ensure that the deep learning network may distinguish this sample from a negative sample. In the past, deep learning networks did not consider a difference between positive samples when optimizing this problem. It is believed that errors or gradients caused by a distance between positive samples in the training operation should be treated the same. According to example embodiments, a deep learning network should be constrained according to a similarity in the optimization operation, that is, for positive samples, a distance between the more similar positive samples should be closer, and a distance between the more dissimilar positive samples should be slightly larger but at the same time should be less than a distance between the negative samples.

In this regard, according to example embodiments, a similarity between two images should be related to an overlap area of fields of view of the two images. Here, IOU is used as a measuring standard of a similarity between images, and because the IOU is also a measurement function commonly used in other fields such as segmentation and detection, an objective function has two purposes. One of the purposes is to distinguish between positive samples and negative samples, and another purpose is to sort positive samples based on the IOU.

In an example embodiment, when training the IOU-based image depth feature extraction network, an anchor point image and a positive sample image may be obtained from a training image. Then the IOU-based image depth feature extraction network may be trained according to the anchor point image, the positive sample image, and a degree of similarity between the anchor point image and the positive sample image.

In an example embodiment, when obtaining the anchor point image and the positive sample image form the training image, random sampling may be performed on the training image to obtain the anchor point image, and the degree of similarity between the anchor point image and the positive sample image may be obtained through random sampling. Then an image in which a degree of similarity with the anchor point image is the obtained degree of similarity may be sampled from the training image as the positive sample image.

In an example embodiment, the degree of similarity between the anchor point image and the positive sample image may be an IOU.

In an example embodiment, after obtaining the anchor point image and the positive sample image from the training image, projective transformation may be provided on one or more of the anchor point image and the positive sample image.

Figure 3:
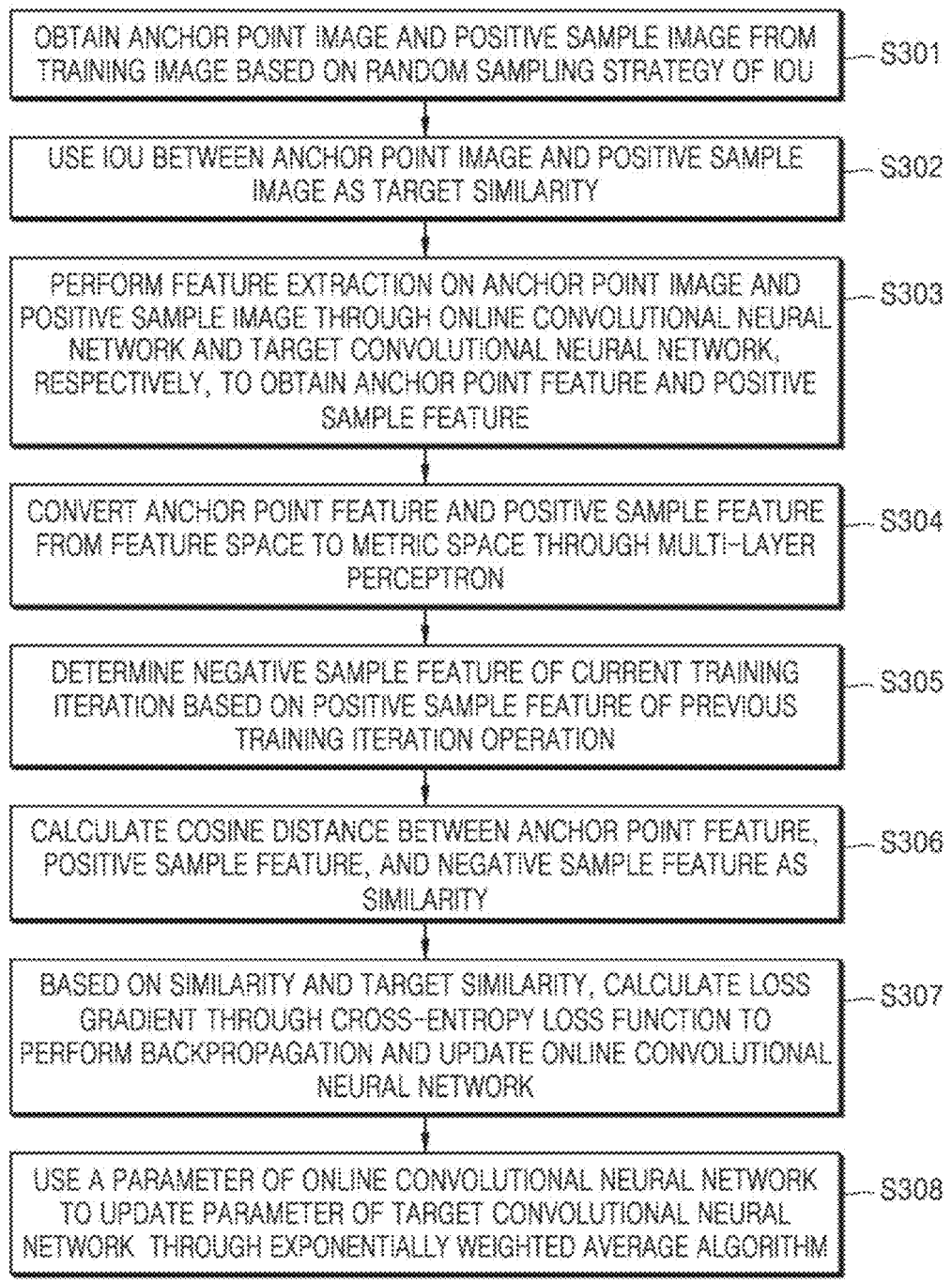
Figure 4:
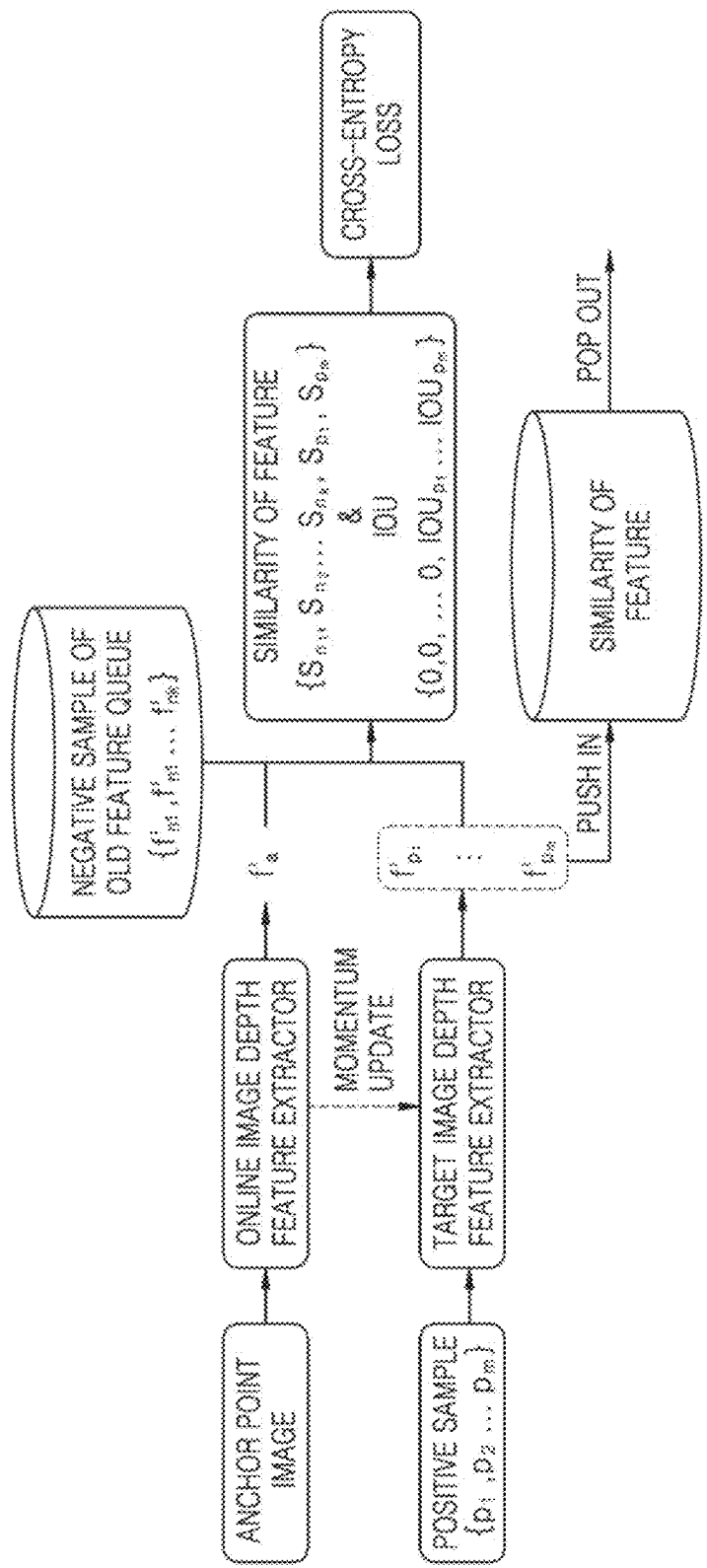
FIG. 4 shows a training of an IOU-based image depth feature extraction network according to an example embodiment.
Figure 5:
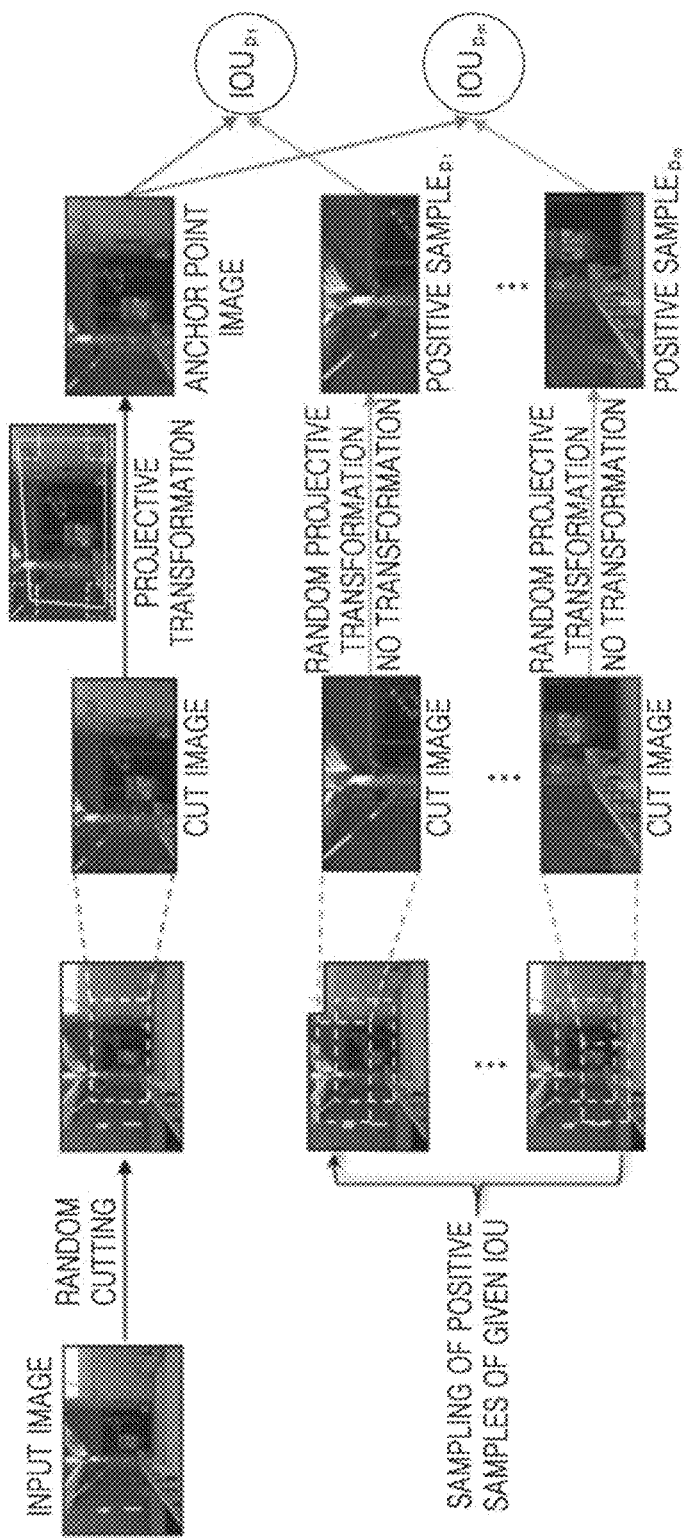
FIG. 5 shows positive sample sampling when training an IOU-based image depth feature extraction network according to an example embodiment.
Figure 6:
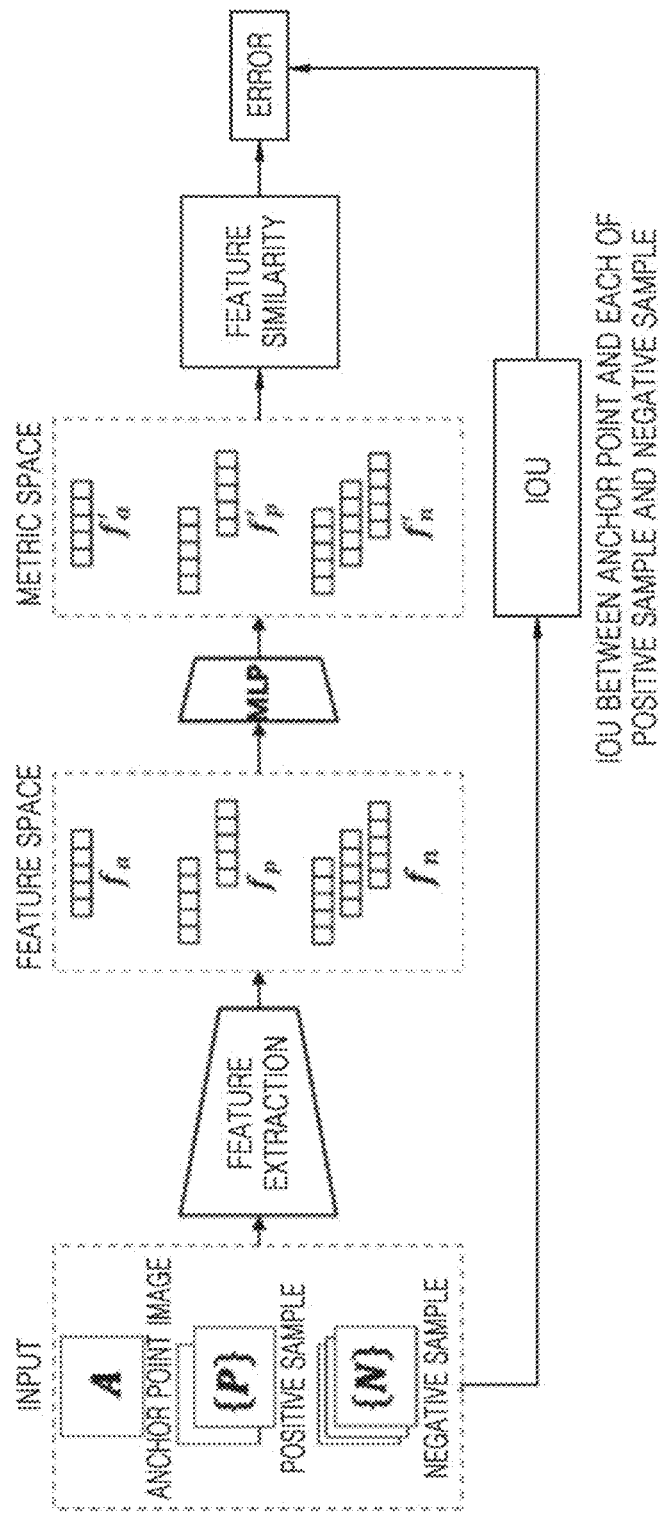
FIG. 6 shows a training principle of an IOU-based image depth feature extraction network according to an example embodiment.

FIG. 3 is a flowchart of a training iteration operation of an IOU-based image depth feature extraction network according to an example embodiment. FIG. 4 shows a training of an IOU-based image depth feature extraction network according to an example embodiment. In FIG. 4, an old feature queue negative sample $\{f_{n_1}', f_{n_2}', \ldots, f_{n_k}'\}$ is used to represent a negative sample feature. FIG. 5 shows a positive sample sampling when training an IOU-based image depth feature extraction network according to an example embodiment. In FIG. 5, an input image is used to represent an input training image. FIG. 6 shows a training principle of an IOU-based image depth feature extraction network according to an example embodiment.

As shown in FIG. 3, in a training iteration operation, in operation S301, an anchor point image and a positive sample image are obtained from a training image based on a random sampling strategy of the IOU.

In an example embodiment, when obtaining the anchor image and the positive sample image from the training image based on the random sampling of the IOU, random sampling may be performed on the training image to obtain the anchor image, random sampling may be performed to obtain the IOU. Then an image in which an IOU thereof with the anchor image is the above IOU may be sampled from the training image as the positive sample image.

In particular, the IOU may be obtained by random sampling through, for example, but not limited to, an average random distribution algorithm. For example, $\{IOU_{p1}, IOU_{p2}\}$ may be randomly obtained twice between [0~1].

As shown in FIG. 5, each input training image is randomly cropped and a cropped image is used as an anchor image Anchor, the training image is cropped so that an IOU between an image after cropping and the anchor image Anchor is equal to $\{IOU_{p1}, IOU_{p2}\}$, and a result obtained by cropping is used as a positive sample, thereby obtaining two positive samples $\{p_1, p_2\}$. According to example embodiments, two positive samples are taken as an example, and there may be multiple positive samples in an actual application operation, which is not limited in the present disclosure.

In operation S302, the IOU between the anchor image and the positive sample image is taken as a target similarity. For example, $\{IOU_{p1}, IOU_{p2}\}$, which is randomly obtained twice between [0~1], may be used as the target similarity.

In an example embodiment, after the anchor point image and the positive sample image are obtained from the training image, projective transformation may also be performed on the anchor point image and the positive sample image, and the anchor point image and the positive sample image transformed after projective transformation are used as the anchor point image and the positive sample image.

According to a random algorithm, it is determined whether it is necessary to do warp on the anchor image Anchor and two positive samples {$p_1$, $p_2$} to perform projective transformation. If necessary, a quadrilateral formed by four points is randomly selected from four rectangular areas of an image for performing cropping and photographic transformation, and then other data enhancement changes commonly used in deep learning, such as random cropping and resizing, random color luminosity changes, random gray scale changes, random Gaussian blur, random horizontal flips, etc., may be performed to obtain a final anchor point Anchor and positive samples {$p_1$, $p_2$}.

In operation S303, feature extraction is performed on the anchor point image and the positive sample image through an online convolutional neural network and a target convolutional neural network, respectively, thereby obtaining an anchor point feature and a positive sample feature.

As shown in FIG. 4, the anchor point Anchor and the positive samples {$p_1$, $p_2$} are respectively sent to the online convolutional neural network Online and the target convolutional neural network Target to obtain corresponding features $f_a'$ and {$f_{p_1}$, $f_{p_2}$}.

In operation S304, the anchor point feature and the positive sample feature are transformed from a feature space to a metric space through a multi-layer perceptron (MLP).

As shown in FIG. 6, structures of the online convolutional neural network Online and the target convolutional neural network Target are exactly the same, and the last two layers thereof are an MLP. The feature $f_a$ and features {$f_{p_1}$, $f_{p_2}$} are transformed from the feature space to the metric space through the multi-layer perceptron MLP, and features in the metric space are normalized to obtain $f_a'$ and {$f_{p_1}$, $f_{p_2}$}.

In operation S305, a negative sample feature of a current training iteration is determined based on a positive sample feature in a previous training iteration operation.

In an example embodiment, when determining the negative sample feature of the current training iteration based on the positive sample feature of the previous training iteration operation, the negative sample feature is zero during a first training iteration operation; and in each training iteration operation after the first time, the negative sample feature in the current training iteration operation is determined based on the positive sample feature and the negative sample feature in the previous training iteration operation.

As shown in FIG. 4, a feature queue {$f_{n_1}'$, $f_{n_2}'$, ..., $f_{n_k}'$} in the previous training iteration operation may be taken as the negative sample features, and a cosine distance between the anchor point feature $f_a'$ and the negative sample feature {$f_{n_1}'$, $f_{n_2}'$, ..., $f_{n_k}'$} is calculated as a similarity between the anchor point image Anchor and the negative sample, thereby obtaining the similarity {$s_{n_1}$, $s_{n_2}$, ..., $s_{n_k}$, $s_{p_1}$, $s_{p_2}$} between the anchor point Anchor and the positive sample and the negative sample, wherein $s_{n_i}=0$, $i \in \{1, ..., k\}$.

In operation S306, the cosine distance between the anchor point feature, the positive sample feature, and the negative sample feature is calculated as the similarity.

In particular, the cosine distance between the anchor point features $f_a'$ and positive sample features {$f_{p_1}'$, $f_{p_2}'$} is calculated as the similarity between the anchor point image Anchor and the positive sample image {$s_{p_1}$, $s_{p_1}$}. In FIG. 3, the similarity is represented by a feature similarity score.

In operation S307, based on the similarity and the target similarity, a cross-entropy loss function is used to calculate a loss and a gradient to perform backpropagation and update the online convolutional neural network.

For example, the target similarity {$IOU_{p_1}$, $IOU_{p_2}$} may be used as a supervision signal, that is, {0, 0, ... 0, $IOU_{p_1}$, $IOU_{p_2}$}. As shown in the following equation, the loss and the gradient are calculated through the cross-entropy loss function to perform backpropagation and update the online convolutional neural network Online. Here, m represents the number of positive samples, and k represents the number of negative samples. A feature is randomly selected from the features {$f_{p_1}'$, $f_{p_2}'$} of the positive sample and sent to a feature queue {$f_{n_1}'$, $f_{n_2}'$, ..., $f_{n_k}'$} with a fixed length as a negative sample feature of a next iteration.

$$IOU \text{ Loss} = \sum_{i=1}^{m} -p_i \log q_i + \sum_{j=1}^{k} -p_j \log q_j = \sum_{i=1}^{m} -IOU_m \times \log \frac{\exp(f_g', f_{p_1}')}{\sum_{i=1}^{m}\exp(f_a' \cdot f_{p_1}') + \sum_{j=1}^{k}\exp(f_a \cdot f_{n_i}')}$$

$$= \sum_{i=1}^{m} -IOU_m \times \log \frac{\exp(s_{p_i})}{\sum_{i=1}^{m}\exp(s_{p_i}) + \sum_{j=1}^{k}\exp(x_{a_j})}$$

In operation S308, a parameter θOnline of the online convolutional neural network is used to update a parameter θTarget of the target convolutional neural network through an exponentially weighted average algorithm.

For example, the parameter $\theta_{Online}$ of the online convolutional neural network Online may be used to update the parameter $\theta_{Target}$ of the target convolutional neural network Target through the exponentially weighted average algorithm according to an equation $\theta_{Target} = m\theta_{Target} + (1-m)\theta_{Online}$, wherein, a momentum parameter is m=0.999, which enables the target convolutional neural network Target to obtain better feature learning capabilities through a learning operation. At the same time, the exponential weighted average algorithm may also ensure that the target convolutional neural network Target may have a stable feature space to ensure that the online convolutional neural network Online may converge during the training operation.

In operation S309, when the online convolutional neural network reaches a preset termination condition, the online convolutional neural network and the target convolutional neural network are used as the IOU-based image depth feature extraction network.

A remaining portion after removing the last multilayer perceptron MLP of the online convolutional neural network Online is used as the IOU-related image depth feature extraction network, which may be used to perform scene recognition in loop-closure detection and re-localization for a SLAM system and to find a similar key frame image as a common view frame image.

Figure 7:
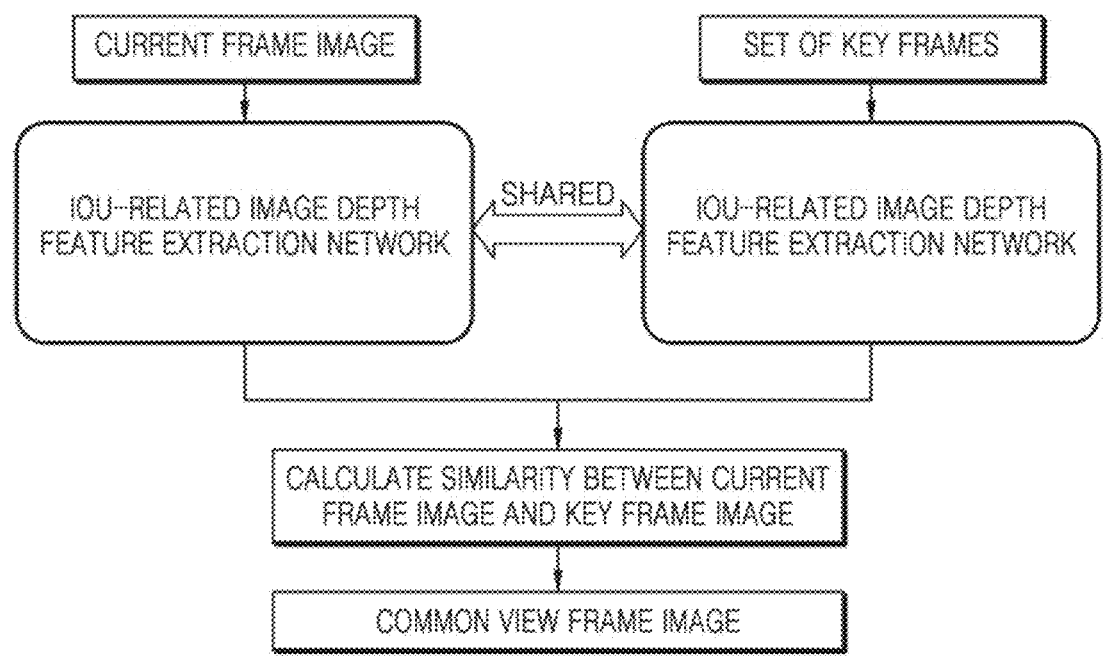
FIG. 7 shows an operation of searching a key frame having a greatest similarity of a current frame image in a global map through an IOU-based image depth feature extraction network according to an example embodiment.

FIG. 7 shows an operation of searching a key frame having a greatest similarity of a current frame image in a global map through an IOU-based image depth feature extraction network according to an example embodiment. As shown in FIG. 7, the global descriptor of the current frame image and the global descriptor of each key frame image in the set of key frames are extracted through a shared IOU-related image depth feature extraction network. Then an IOU-related error function is calculated based on the global descriptor, thereby obtaining a key frame image having the greatest similarity of the current frame image in the global map according to the error function.

Referring back to FIG. 1, in operation S103, a camera pose of the current frame image is determined according to the key frame image.

In an example embodiment, when determining the camera pose of the current frame image according to the key frame image, a feature point matching relationship between the current frame image and the key frame image may be obtained. Then the camera pose of the current frame image may be calculated based on the feature point matching relationship between the current frame image and the key frame image.

Calculating the feature point matching relationship (that is, data association) between two images is an important operation in an operation of SLAM. There are two related methods for calculating the feature point matching relationship (that is, implementing data association) between two images. As a first method, by extracting feature points and descriptors, and then according to the similarity between the descriptors, an initial matching relationship between two images is selected, and a RANSAC algorithm is finally used to filter out wrong matches, thereby obtaining final data association. As a second method, through an optical flow method, feature points on an image of a previous frame find feature points similar to a descriptor in a neighborhood region on a next frame, and then the RANSAC algorithm is used to filter out wrong matches, thereby obtaining final data association. Herein, the optical flow method only operates in the neighborhood region. When a motion between two frames is large, the optical flow method may not find the data association. For loop-closure detection and re-localization, the related method may only be implemented by the first method, and a related descriptor has weak expressive ability, which makes it often impossible to find a correct matching relationship. At present, the SuperGlue network may consider a descriptor and research a position constraint relationship between feature points through a graph neural network, which greatly improves a success rate of finding data associations. However, when a SuperGlue network considers the position constraint relationship of the feature points, only two-dimensional coordinates of the feature points are considered. This makes depth information of the feature points ignored, and scene structure information is ignored when looking for data associations. Therefore, example embodiments provide a feature point matching network based on a scene structure, which not only makes full use of a three-dimensional point cloud containing scene structure information and being reconstructed in an operation of the SLAM system, but also improves the accuracy of an operation of finding data associations.

In an example embodiment, when obtaining the feature point matching relationship between the current frame image and the key frame image, a local three-dimensional point cloud of the current frame image and a global three-dimensional point cloud of the key frame image may be obtained, a scene structure of the current frame image and the key frame image is obtained based on the local three-dimensional point cloud of the current frame image and the global three-dimensional point cloud of the key frame image. Then the feature point matching relationship between the current frame image and the key frame image is obtained based on the scene structure of the current frame image and the key frame image.

In an example embodiment, when obtaining the local three-dimensional point cloud of the current frame image, a two-dimensional feature point and a depth value of the current frame image may be obtained. Then a two-dimensional feature point and a depth value of the current frame image may be converted into a local three-dimensional point cloud of the current frame image by using a pose prior.

In an example embodiment, when obtaining the global three-dimensional point cloud of the key frame image, a two-dimensional feature point and a depth value of the key frame image are converted into a global three-dimensional point cloud based on the camera pose of the key frame image.

In an example embodiment, when obtaining the feature point matching relationship between the current frame image and the key frame image based the scene structure of the current frame image and the key frame image, each of the local three-dimensional point cloud and the global three-dimensional point cloud may be encoded through a three-dimensional position encoder to obtain a local high-dimensional feature and a global high-dimensional feature. Then a feature point descriptor of the current frame image and a feature point descriptor of the key frame image are obtained, and the local high-dimensional feature and global high-dimensional feature, as well as the feature point descriptor of the current frame image and the feature point descriptor of the key frame image, are input to a feature point matching network, thereby obtaining the feature point matching relationship between the current frame image and the key frame image.

Figure 8:
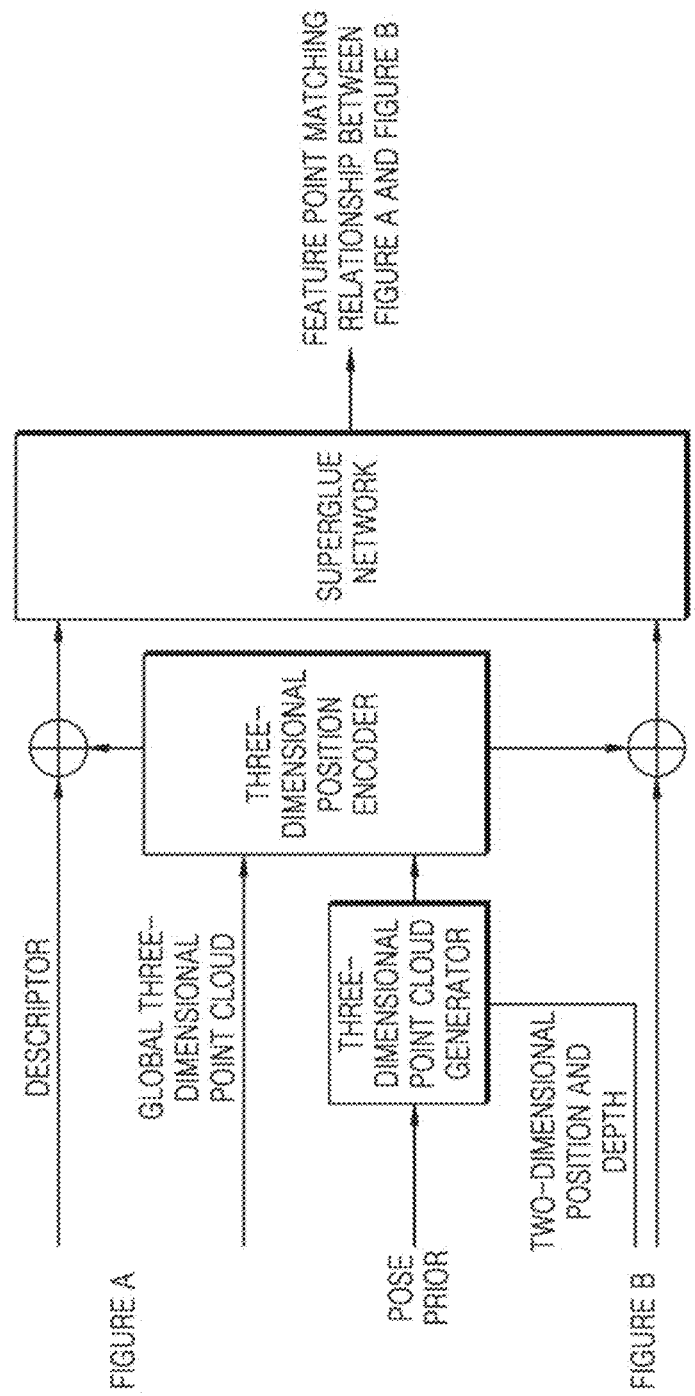
FIG. 8 shows a feature point matching network based on scene structure maintenance according to an example embodiment.
Figure 9:
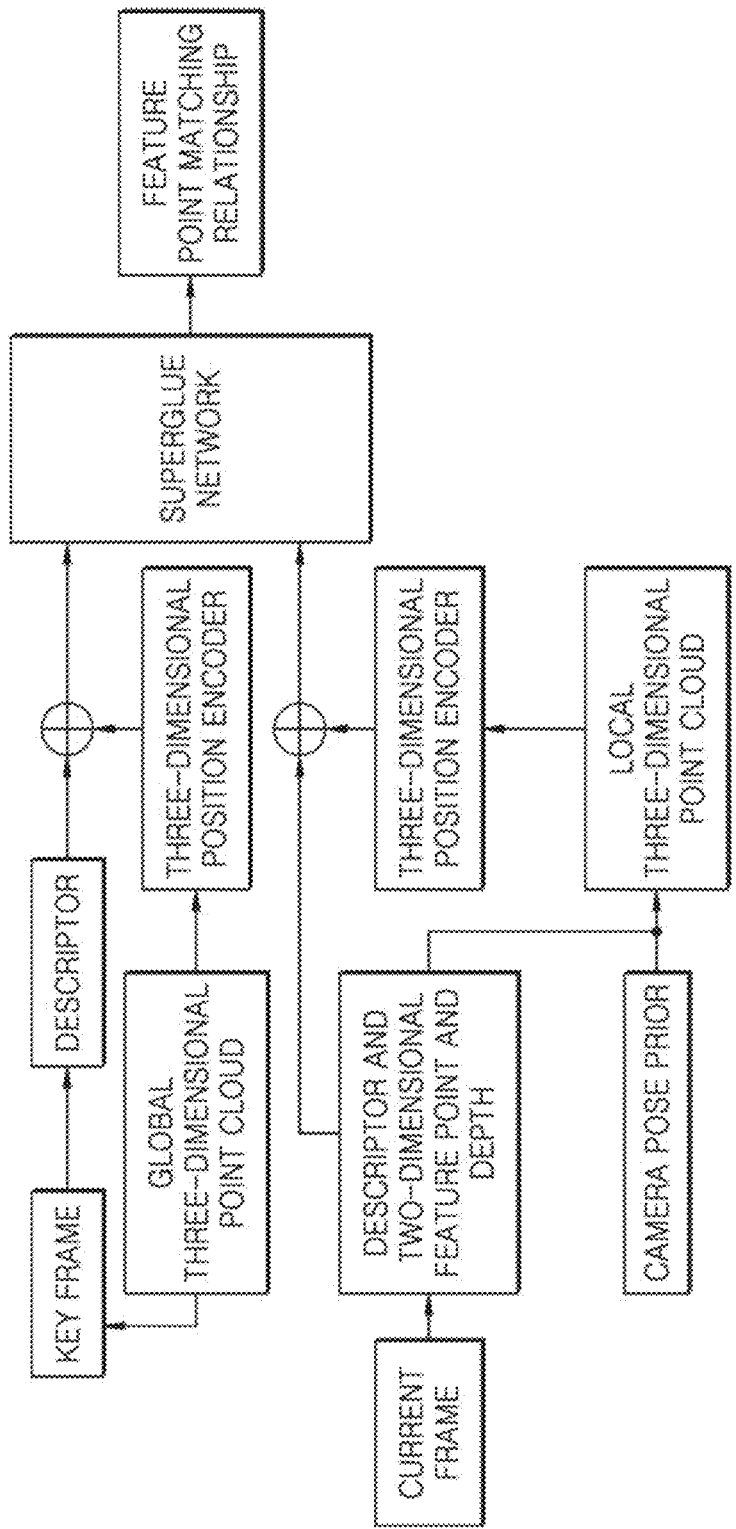
FIG. 9 is a flowchart of calculating a matching relationship of feature points by a feature point matching network based on scene structure maintenance according to an example embodiment.

FIG. 8 shows a feature point matching network based on scene structure maintenance according to an example embodiment. FIG. 9 is a flowchart of calculating a matching relationship of feature points by a feature point matching network based on scene structure maintenance according to an example embodiment.

As shown in FIG. 8, the feature point matching network based on scene structure maintenance may include a three-dimensional point cloud generator, a three-dimensional position encoder, and a SuperGlue network.

As shown in FIG. 9, first, a feature point and a depth thereof on the most similar key frame image retrieved are converted into a three-dimensional point cloud through a camera pose (coordinates) of the key frame image through the three-dimensional point cloud converter, and a high-dimensional feature after passing through the three-dimensional position encoder are connected with a descriptor. At the same time, the feature point and the depth thereof on the current frame image are converted into a three-dimensional point cloud by a camera prior of that image to obtain a sub-global map (as shown in FIG. 2), and a high-dimensional feature after passing through the three-dimensional position encoder are connected with a descriptor. When an ORB feature point extracted in the SLAM system is used, a depth thereof may be automatically obtained during an operation of the SLAM system. When a SuperPoint network is used to extract feature points and descriptors, a depth corresponding to a feature point is obtained through several adjacent frames by using a structure from motion (SFM) algorithm, thereby converting the feature points into a three-dimensional point cloud to obtain a sub-global map. Then, an inner edge is constructed between any feature points in an image, and an outer edge is constructed between any two feature points between two images, thereby constructing an input of a graph neural network. An attention mechanism is used to aggregate between the inner and outer edges respectively, so that a discriminating neighborhood structure may be selected between the inner edges and at the same time a visually similar potential matching relationship between the outer edges. Finally, weight matrices of the inner and outer edges constructed by the graph neural network are used as a criterion for determining whether each edge exists, thereby obtaining the feature point matching relationship between two images.

In an example embodiment, when calculating the camera pose of the current frame image based on the feature point matching relationship between the current frame image and the key frame image, the camera pose of the current frame image may be calculated by a local beam adjustment method or a global beam adjustment method based on the feature point matching relationship between the current frame image and the key frame image.

Figure 10:
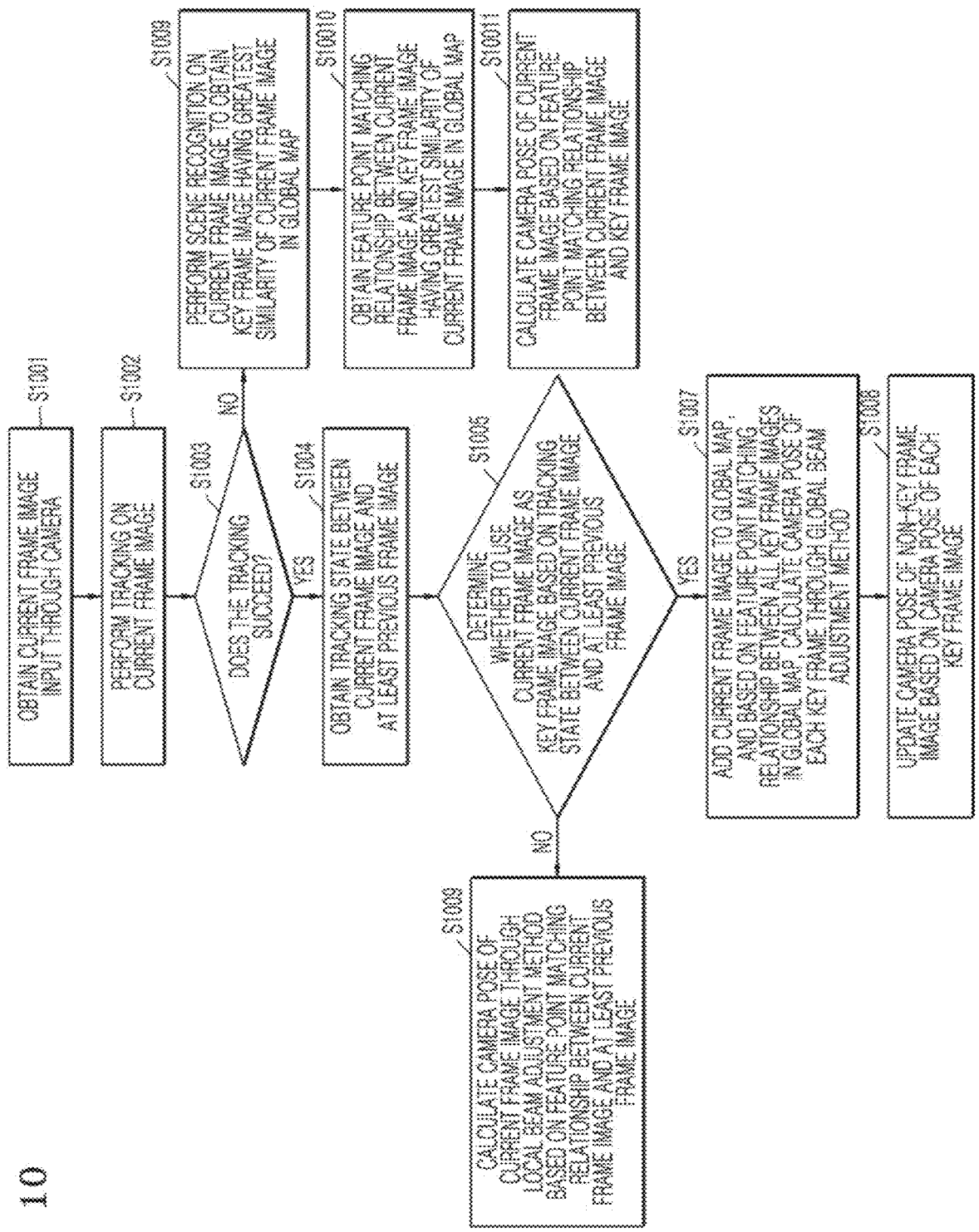
FIG. 10 is a flowchart of a method for SLAM according to an example embodiment.

FIG. 10 is a flowchart of a method for SLAM according to an example embodiment.

Referring to FIG. 10, in operation S1001, a current frame image input through a camera is obtained.

In operation S1002, tracking is performed on the current frame.

In operation S1003, it is determined whether the tracking is successful. The tracking of the current frame image may be implemented by any one of the following two methods. As a first method, an ORB feature point and a corresponding descriptor are extracted from the current frame image and compared with a descriptor of a previous frame of image to obtain a feature point matching relationship between previous and next frames. As a second method, through feature points of a previous frame of image, an optical flow method is used to find corresponding feature points on a current frame, and wrong feature point matches are filtered out through a descriptor to obtain a feature point matching relationship between previous and next frames. When matching feature points obtained on the current frame image are less than a set threshold value, feature points and descriptors will be re-extracted from the current frame image.

In operation S1004, in a case of successful tracking, a tracking state between the current frame image and at least the previous frame image is obtained. When determining a tracking state between two previous and next frames, it is determined by comparing the number of feature points tracked in the current frame image and the number of newly extracted feature points. When the number of tracked feature points is less than a given value of the number of newly extracted feature points exceeds a given value, the current frame image is used as the key frame image.

In operation S1005, it is determined whether to use the current frame image as the key frame image based on a tracking state between the current frame image and at least the previous frame image. By comparing the tracking state between the two previous and next frame images, it may be determined whether to use the current frame image as the key frame image. If the current frame image is selected as the key frame image, it will be added to a global map, which is used for the following local and global beam adjustment methods, as well as loop-closure detection and re-localization.

In operation S1006, when it is determined not to use the current frame image as the key frame image, based on the feature point matching relationship between the current frame image and at least the previous frame image, the camera pose of the current frame image is calculated by the local beam adjustment method. According to the feature point matching relationship between the latest inputted several frames of images, the camera pose corresponding to each frame and three-dimensional coordinates of the feature points may be updated through the local beam adjustment method.

In operation S1007, when it is determined that the current frame image is used as the key frame image, the current frame image is added to the global map, and based on the feature point matching relationship between all key frame images in the global map, the camera post of each key frame image is calculated through the global beam adjustment method. Camera coordinates corresponding to each key frame image may be calculated by the global beam adjustment method based on the feature point matching relationship between all key frame images.

In operation S1008, based on the camera pose of each key frame image, the camera pose of a non-key frame image is updated. A relative pose may be used to update the camera pose of the non-key frame in the local beam adjustment method, thereby implementing data unification in the local beam adjustment method and the global beam adjustment method.

In operation S1009, in a case of tracking failure, scene recognition is performed on the current frame image to obtain a key frame image having the greatest similarity of the current frame image in the global map. The global descriptor of the current frame image is obtained through an IOU-related image depth feature extraction model. The current frame image is input into the IOU-related image depth feature extraction model to obtain the global descriptor of the current frame image. The key frame image which is the most similar to the current frame image is inquired in the global map. The global descriptor corresponding to each key frame image saved in the global map is extracted through the IOU-related image depth feature extraction model. The current frame image will use the global descriptor to find a global descriptor having the smallest distance among the global descriptors corresponding to all key frame images as the most similar global descriptor, thereby obtaining the most similar key frame image of the current frame image as a common view frame image.

In operation S10010, a feature point matching relationship between the current frame image and the key frame image having the greatest similarity of the current frame in the global map is obtained. Feature points and descriptors of the current frame image and the common view frame image of the current frame image may be extracted separately through the SuperPoint network, and through camera poses thereof, a depth corresponding to the feature points is obtained through several adjacent frames by using the SFM algorithm to convert the feature points into a three-dimensional point cloud. At the same time, it is necessary to use the SuperPoint network to extract additional feature points and restore the three-dimensional point cloud, the ORB feature points used in an operation of the SLAM may also be used. A three-dimensional point cloud corresponding to these feature points has been restored during the operation of the SLAM system, and no additional SFM algorithm is needed to calculate the depth corresponding to the feature points.

In operation S10011, the camera pose of the current frame image is calculated based on the feature point matching relationship between the current frame image and the key frame image. The three-dimensional point cloud may be firstly encoded by a three-dimensional position encoder, and an encoding result and a descriptor may be sent to the SuperGlue network as an input to obtain the feature point matching relationship under constraints of the scene structure. The feature point matching relationship between the current frame image and the common view image may be used to restore the camera coordinates of the current input image, and may also BE used in the local beam adjustment method and the global beam adjustment method as a constraint to calculate the camera coordinates of the current frame image.

Figure 11:
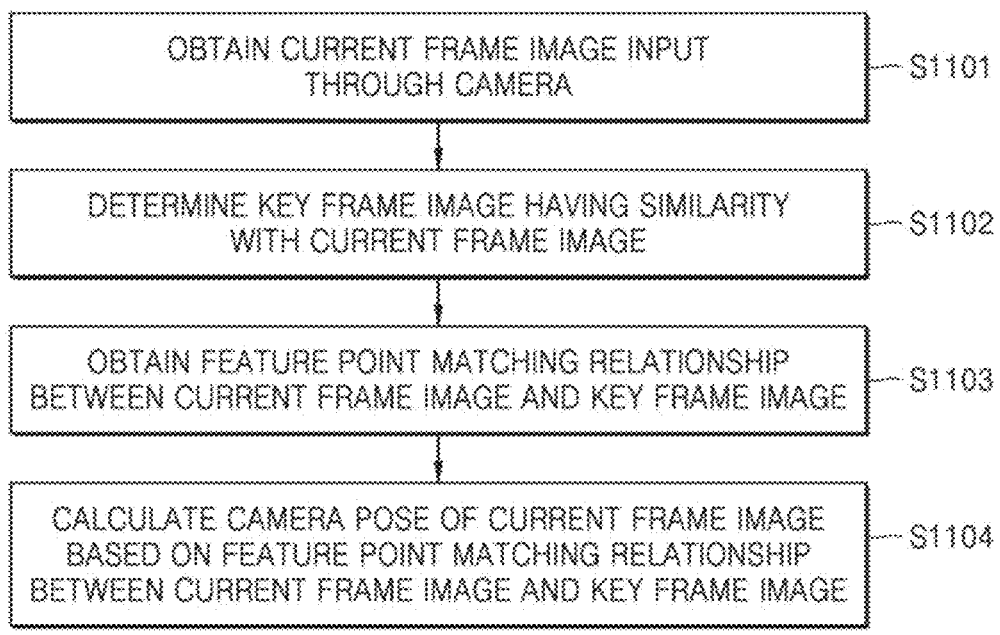
FIG. 11 is a flowchart of a method for SLAM according to another example embodiment.

FIG. 11 is a flowchart of a method for SLAM according to another example embodiment.

Referring to FIG. 11, in operation S1101, a current frame image input through a camera is obtained. In particular, in application scenarios such as autonomous driving, robot navigation, and augmented reality, a camera captures images in real time.

In operation S1102, a key frame image having the similarity to the current frame image is determined. In particular, any method may be used to determine a key frame image having a similarity to the current frame image, however, embodiments are not limited thereto.

In operation S1103, the feature point matching relationship between the current frame image and the key frame image is obtained.

In an example embodiment, when obtaining the feature point matching relationship between the current frame image and the key frame image, a local three-dimensional point cloud of the current frame image and a global three-dimensional point cloud of the key frame image may be firstly obtained, a scene structure of the current frame image and the key frame image is obtained based on the local three-dimensional point cloud of the current frame image and the global three-dimensional point cloud of the key frame image, and then the feature point matching relationship between the current frame image and the key frame image is obtained based on the scene structure of the current frame image and the key frame image.

In an example embodiment, when obtaining the local three-dimensional point cloud of the current frame image, a two-dimensional feature point and a depth value of the current frame image may be obtained. Then the two-dimensional feature point and the depth value of the current frame image may be converted into a local three-dimensional point cloud of the current frame image by using a pose prior.

In an example embodiment, when obtaining the global three-dimensional point cloud of the key frame image, a two-dimensional feature point and a depth value of the key frame image may be converted into a global three-dimensional point cloud based on the camera pose of the key frame image.

In an example embodiment, when obtaining the feature point matching relationship between the current frame image and the key frame image based the scene structure of the current frame image and the key frame image, each of the local three-dimensional point cloud and the global three-dimensional point cloud may be firstly encoded through a three-dimensional position encoder to obtain a local high-dimensional feature and a global high-dimensional feature. Then a feature point descriptor of the current frame image and a feature point descriptor of the key frame image are obtained, and the local high-dimensional feature and the global high-dimensional feature, as well as the feature point descriptor of the current frame image and the feature point descriptor of the key frame image, are input to a feature point matching network, thereby obtaining the feature point matching relationship between the current frame image and the key frame image.

In operation S1104, the camera pose of the current frame image is calculated based on the feature point matching relationship between the current frame image and the key frame image.

In an example embodiment, when calculating the camera pose of the current frame image based on the feature point matching relationship between the current frame image and the key frame image, the camera pose of the current frame image may be calculated by a local beam adjustment method or a global beam adjustment method based on the feature point matching relationship between the current frame image and the key frame image.

In addition, according to an example embodiment, a computer-readable storage medium having a computer program stored thereon is further provided, and when the computer program is executed, the method for SLAM of an example embodiment may be implemented.

In an example embodiment, the computer-readable storage medium may carry one or more programs, and when a computer program is executed, the following operations obtaining a current frame image input through a camera, performing scene recognition on the current frame image to obtain a key frame image having the greatest similarity of the current frame image in a global map, obtaining a feature point matching relationship between the current frame image and the key frame image, and calculating a camera pose of the current frame image based on the feature point matching relationship between the current frame image and the key frame image, may be implemented.

The computer-readable storage medium may be, for example, but not limited to, an electrical, magnetic, optical, electromagnetic, infrared, or semiconductor system, device or apparatus, or a combination thereof. For example, the computer-readable storage medium may include, but is not limited to an electrically connected and portable computer disk with one or more wires, hard disk, random access memory (RAM), read-only memory (ROM), erasable programmable read-only memory (EPROM or flash memory), an optical fiber, portable compact disk read-only memory (CD-ROM), an optical storage device, a magnetic storage device, or any suitable combination thereof. In an example embodiment, the computer-readable storage medium may be any tangible medium that contains or stores a computer program, and the computer program may be used by or in combination with an instruction execution system, device, or apparatus. The computer program included on the computer-readable storage medium may be transmitted by any suitable medium, including but not limited to: wire, optical cable, radio frequency (RF), or the like, or any suitable combination thereof. The computer-readable storage medium may be contained in any device; or may also exist alone without being assembled into the device.

In addition, according to an example embodiment, a computer program product may be further provided, and the instructions in the computer program product may be executed by a processor of a computer device to complete the method for SLAM according to an example embodiment.

The method for SLAM according to example embodiments has been described above with reference to FIGS. 1 to 11. Hereinafter, a device for SLAM according to example embodiments and components thereof will be described with reference to FIGS. 12 to 14.

Figure 12:
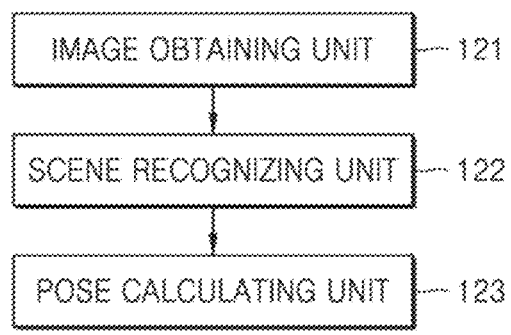
FIG. 12 is a block diagram of a device for SLAM according to an example embodiment.

FIG. 12 is a block diagram of a device for SLAM according to an example embodiment.

Referring to FIG. 12 the device for SLAM includes an image obtaining unit 121, a scene recognizing unit 122, and a pose calculating unit 123.

The image obtaining unit 121 is configured to obtain a current image frame input through a camera.

The scene recognizing unit 122 is configured to perform scene recognition on the current frame image to obtain a key frame image having the greatest similarity of the current frame image in a global map.

In an example embodiment, the scene recognizing unit 122 may include a descriptor obtaining unit configured to obtain a global descriptor of the current frame image; and a key frame inquiry unit configured to inquire the global map for the key image frame having the greatest similarity to the current frame image based on the global descriptor of the current frame image.

In an example embodiment, the key frame inquiry unit may be configured to calculate a distance between a global descriptor of each key frame in the global map and the global descriptor of the current frame image, and determine a similarity between the global descriptor of the key frame image and the global descriptor of the current frame image according to the distance between the global descriptor of the key frame image and the global descriptor of the current frame image. Here, as the distance between the global descriptor of the key frame image and the global descriptor of the current frame image decreases, the similarity between the key frame image and the current frame image increases.

In an example embodiment, the descriptor obtaining unit may be configured to obtain the global descriptor of the current frame image through an IOU-based image depth feature extraction network.

In an example embodiment, the device may further include a extraction network training unit configured to obtain an anchor point image and a positive sample image from a training image, and perform training on the IOU-based image depth feature extraction network according to the anchor point image, the positive sample image, and a degree of similarity between the anchor point image and the positive sample image. When perform training on the IOU-based image depth feature extraction network, an IOU score between the anchor point image and the positive sample image is taken as a target similarity, feature extraction is performed on the anchor point image and the positive sample image through an online convolutional neural network and a target convolutional neural network, respectively, to obtain an anchor point feature and a positive sample feature, the anchor point feature and the positive sample feature are transformed from a feature space to a metric space through an MLP, a negative sample feature of a current training iteration is determined based on a positive sample feature in a previous training iteration operation, a cosine distance between the anchor point feature, the positive sample feature, and the negative feature calculated as a similarity, based on the similarity and the target similarity, a cross-entropy loss function is used to calculate a loss and a gradient to perform backpropagation and update the online convolutional neural network; a parameter $\theta_{Online}$ of the online convolutional neural network is used to update a parameter $\theta_{Target}$ of the target convolutional neural network through an exponentially weighted average algorithm, and when the online convolutional neural network reaches a preset termination condition, the online convolutional neural network and the target convolutional neural network are used as the IOU-based image depth feature extraction network.

In an example embodiment, the extraction network training unit may be configured to perform random sampling on the training image to obtain an anchor point image, perform random sampling to obtain a degree of similarity between the anchor point image and a positive sample image, and perform sampling, on the training image, for an image in which a degree of similarity with the anchor point image is the obtained degree of similarity as the positive sample image.

In an example embodiment, the extraction network training unit may be configured to: set the negative sample feature as zero during a first training iteration operation, and in each training iteration operation after the first time, determine the negative sample feature in the current training iteration operation based on the positive sample feature and the negative sample feature in the previous training iteration operation.

In an example embodiment, the degree of similarity between the anchor point image and the positive sample image may be an IOU.

In an example embodiment, the extraction network training unit may be further configured to after obtaining the anchor point image and the positive sample image from the training image, perform projective transformation on one or more of the anchor point image and the positive sample image to use the anchor point image and positive sample image after projective transformation as the anchor point image and the positive sample image, respectively.

The pose calculating unit 123 is configured to determine a camera pose of the current frame image according to the key frame image.

In an example embodiment, the pose calculating unit 123 may include a matching relationship obtaining unit and a pose calculating sub-unit. The matching relationship obtaining unit may be configured to obtain a feature point matching relationship between the current frame image and the key frame image. The pose calculating sub-unit may be configured to calculate the camera pose of the current frame image based on the feature point matching relationship between the current frame and the key frame image.

In an example embodiment, the matching relationship obtaining unit may include a three-dimensional point cloud obtaining unit configured to obtain a local three-dimensional point cloud of the current image and a global three-dimensional point cloud of the key frame image, a scene structure obtaining unit configured to obtain a scene structure of the current frame image and the key frame image based on the local three-dimensional point cloud of the current frame image and the global three-dimensional point cloud of the key frame image, and a feature point matching unit configured to a feature point matching relationship between the current frame image and the key frame image based on the scene structure of the current frame image and the key frame image.

In an example embodiment, the three-dimensional point cloud obtaining unit is configured to obtain a two-dimensional feature point and a depth value of the current frame image, and convert the two-dimensional feature point and the depth value of the current frame image into the local three-dimensional point cloud of the current frame image by using the pose prior.

In an example embodiment, the three-dimensional point cloud obtaining unit may be configured to convert a two-dimensional feature point and a depth value of the key frame image into the global three-dimensional point cloud based on the camera pose of the key frame image.

In an example embodiment, the feature point matching unit may be configured to perform encoding on each of the local three-dimensional point cloud and the global three-dimensional point cloud through a three-dimensional position encoder to obtain local a high-dimensional feature and a global high-dimensional feature, obtain a feature point descriptor of the current frame image and a feature point descriptor of the key frame image, and input the local high-dimensional feature and the global high-dimensional feature, as well as the feature point descriptor of the current frame image and the feature point descriptor of the key frame image, to a feature point matching network to obtain the feature point matching relationship between the current frame image and the key frame image.

In an example embodiment, the pose calculating sub-unit may be configured to calculate the camera pose of the current frame image through a local beam adjustment method or a global beam adjustment method based on the feature point matching relationship between the current frame image and the key frame image.

Figure 13:
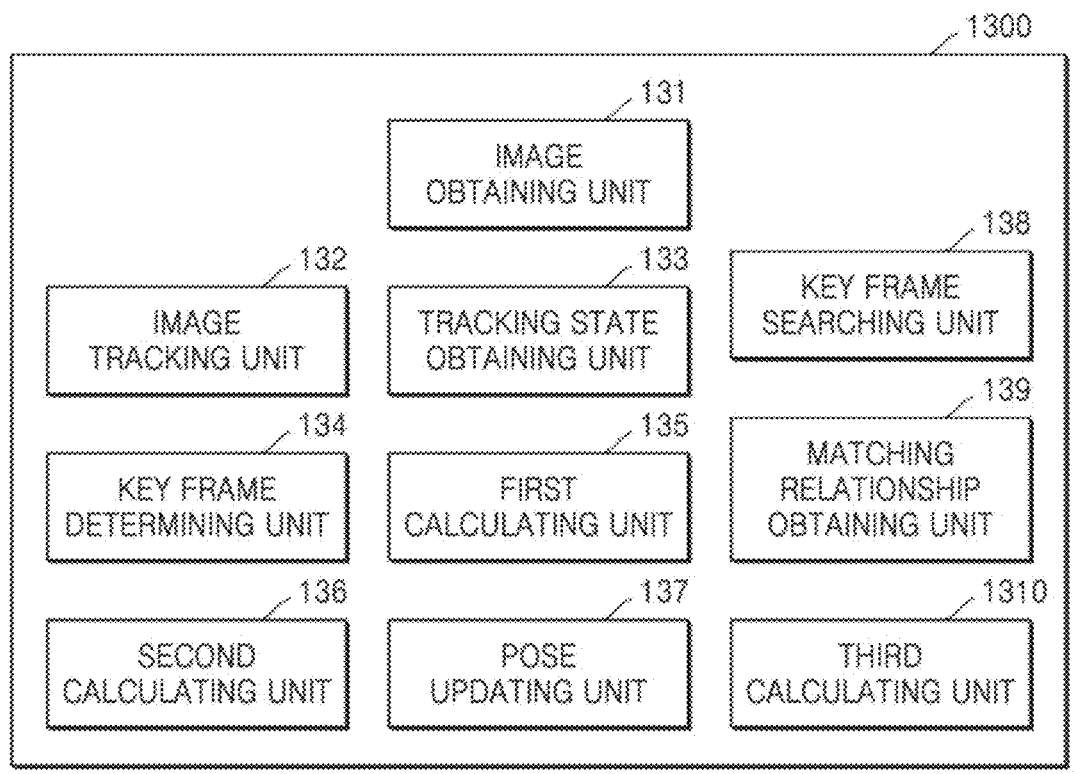
FIG. 13 is a block diagram of a device for SLAM according to another example embodiment.

FIG. 13 is a block diagram of a device for SLAM 1300 according to another example embodiment.

Referring to FIG. 13, the device for SLAM 1300 includes an image obtaining unit 131, an image tracking unit 132, a tracking state obtaining unit 133, a key frame determining unit 134, a first calculating unit 135, a second calculating unit 136, a pose updating unit 137, a key frame searching unit 138, a matching relationship obtaining unit 139, and a third calculating unit 1310.

The image obtaining unit 131 is configured to obtain a current image frame input through a camera.

The image tracking unit 132 is configured to perform tracking on the current frame image.

The tracking state obtaining unit 133 is configured to, in a case of successful tracking, obtain a tracking state between the current frame image and at least a previous frame image.

The key frame determining unit 134 is configured to determine whether to use the current frame image as a key frame image based on the tracking state between the current frame image and at least the previous frame image.

The first calculating unit 135 is configured to, when the current frame image is determined not to be used as the key frame image, calculate a camera pose of the current frame image through a local beam adjustment method based on a feature point matching relationship between the current frame image and at least the previous frame image.

The second calculating unit 136 is configured to, when the current frame image is determined to be used as the key frame image, add the current frame image to a global map and calculate a camera pose of each key frame image through a global beam adjustment method based on the feature point matching relationship between all key frame images in the global map.

The pose updating unit 137 is configured to update a camera pose of a non-key frame image based on the camera pose of each key frame.

The key frame searching unit 138 is configured to, in a case of tracking failure, perform scene recognition on the current frame image to obtain a key frame image having the greatest similarity of the current frame image in the global map.

The matching relationship obtaining unit 139 is configured to obtain a feature point matching relationship between the current frame image and the key frame image.

The third calculating unit 1310 is configured to calculate the camera pose of the current frame image based on the feature point matching relationship between the current frame and the key frame image.

Figure 14:
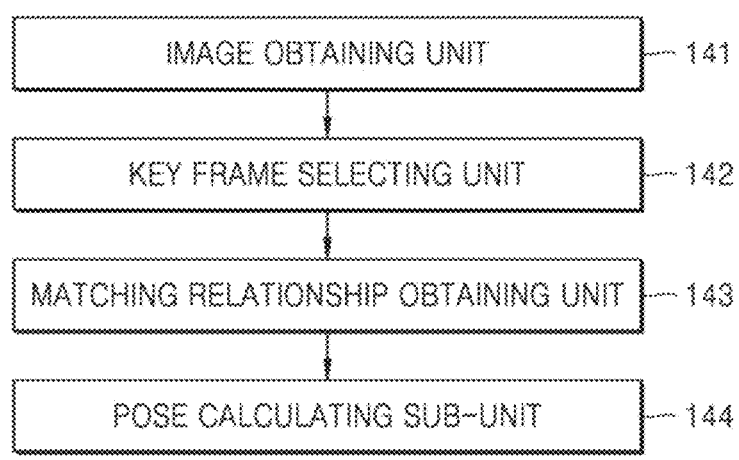
FIG. 14 is a block diagram of a device for SLAM according to another example embodiment.

FIG. 14 is a block diagram of a device for SLAM according to another example embodiment.

Referring to FIG. 14, the device for SLAM includes an image obtaining unit 141, a key frame selecting unit 142, a matching relationship obtaining unit 143, and a pose calculating sub-unit 144.

The image obtaining unit 141 is configured to obtain a current frame image input through a camera.

The key frame selecting unit 142 is configured to determine a key frame image having the greatest similarity to the current frame image.

The matching relationship obtaining unit 143 is configured to obtain a feature point matching relationship between the current frame image and the key frame image.

In an example embodiment, the matching relationship obtaining unit 143 may include a three-dimensional point cloud obtaining unit configured to obtain a local three-dimensional point cloud of the current image and a global three-dimensional point cloud of the key frame image, a scene structure obtaining unit configured to obtain a scene structure of the current frame image and the key frame image based on the local three-dimensional point cloud of the current frame image and the global three-dimensional point cloud of the key frame image, and a feature point matching unit configured to obtain a feature point matching relationship between the current frame image and the key frame image based on the scene structure of the current frame image and the key frame image.

In an example embodiment, the three-dimensional point cloud obtaining unit may be configured to obtain a two-dimensional feature point and a depth value of the current frame image, and convert the two-dimensional feature point and the depth value of the current frame image into the local three-dimensional point cloud of the current frame image by using the pose prior.

In an example embodiment, the three-dimensional point cloud obtaining unit may be configured to convert a two-dimensional feature point and a depth value of the key frame image into the global three-dimensional point cloud based on the camera pose of the key frame image.

In an example embodiment, the feature point matching unit may be configured to perform encoding on each of the local three-dimensional point cloud and the global three-dimensional point cloud through a three-dimensional position encoder to obtain a local high-dimensional feature and a global high-dimensional feature, obtain a feature point descriptor of the current frame image and a feature point descriptor of the key frame image, and input the local high-dimensional features and global high-dimensional features, as well as the feature point descriptor of the current frame image and the feature point descriptor of the key frame image to a feature point matching network to obtain the feature point matching relationship between the current frame image and the key frame image.

The pose calculating sub-unit 144 is configured to calculate the camera pose of the current frame image based on the feature point matching relationship between the current frame and the key frame image.

In an example embodiment, the pose calculating sub-unit 144 may be configured to calculate the camera pose of the current frame image through a local beam adjustment method or a global beam adjustment method based on the feature point matching relationship between the current frame image and the key frame image.

The term "unit" used herein may be a hardware component such as a processor or a circuit and/or a software component executed by a hardware component such as a processor.

The device for SLAM according to example embodiments has been described above with reference to FIGS. 12 to 14. Next, a computing device according to an example embodiment will be described with reference to FIG. 15.

Figure 15:
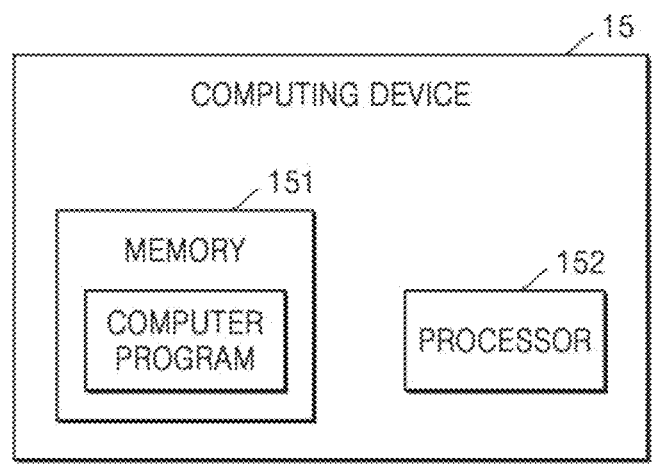
FIG. 15 shows a computing device according to an example embodiment.

FIG. 15 shows a computing device 15 according to an example embodiment.

Referring to FIG. 15, the computing device 15 according to an example embodiment includes a memory 151 and a processor 152. The memory 151 stores a computer program thereon, and when the computer program is executed by the processor 152, the method for SLAM according to an example embodiment is implemented.

In an example embodiment, when the computer program is executed by the processor 152, the following operations, may be implemented obtaining a current frame image input through a camera, performing scene recognition on the current frame image to obtain a key frame image having the greatest similarity of the current frame image in a global map, obtaining a feature point matching relationship between the current frame image and the key frame image, and calculating a camera pose of the current frame image based on the feature point matching relationship between the current frame image and the key frame image, may be implemented.

The computing device 15 according to an example embodiment may include, but is not limited to, a device such as a mobile phone, a notebook computer, a personal digital assistant (PDA), a tablet computer (PAD), a desktop computer, or the like. The computing device 15 shown in FIG. 15 is only an example, and should not bring any limitation to the function and scope of use of the embodiments.

The method and device for SLAM according to example embodiments has been described with reference to FIGS. 1 to 15. However, it should be understood that the device for SLAM and the components thereof shown in FIGS. 12 to 14 may be respectively configured as software, hardware, firmware, or any combination thereof, and the computing device 15 shown in FIG. 15 is not limited to include the components shown above, but some components may be added or deleted as needed, and the above components may also be combined.

In the method and device for SLAM according to example embodiments, a current frame image input through a camera is obtained, scene recognition is performed on the current frame image to obtain a key frame image having the greatest similarity of the current frame image in a global map, a camera pose of the current frame image is determined according to the key frame image, and thus, for an image captured by the camera, feature points and descriptors may be extracted by related algorithms for tracking, and then the camera pose may be calculated by a beam adjustment method, also, loop-closure detection and re-localization may be performed through a deep learning model, a most similar key frame image may be selected from the global map formed by key frames for the current frame image captured by the camera, and the camera pose of the current frame is determined according to the key frame image.

According to the method and device for SLAM according to example embodiments, a current frame image input through a camera is obtained, a key image having a similarity with the current frame image is determined; a feature point matching relationship between the current frame image and the key frame image is obtained, a camera pose of the current frame image is calculated based on the feature point matching relationship between the current frame image and the key frame image, and thus, for an image captured by the camera, feature points and descriptors may be extracted by related algorithms for tracking, and then the camera pose may be calculated by a beam adjustment method. In addition, loop-closure detection and re-localization may be performed through a deep learning model, a most similar key frame image is determined for the current frame image captured by the camera, and the feature point matching relationship between the current frame image and the determined key frame image is calculated (that is, data association).

In addition, according to the method and device for SLAM according to example embodiments, a unsupervised deep learning model may be used to obtain a model with better generalization capabilities, and at the same time, expressive capabilities of deep features may be improved through an IOU-related image depth feature extraction method, thereby more accurately finding better similar images, and a data association model based on a scene structure is also used to find a feature point matching relationship between a current frame image and an inquired key frame image to restore a camera pose of the current frame image.

Although the present disclosure has been particularly shown and described with reference to the example embodiments, those of ordinary skill in the art should understand that changes in forms and details may be made without departing from the spirit and scope of the present disclosure as defined by the claims and their equivalents.

What is claimed is:

1. A method for simultaneous localization and mapping (SLAM), the method comprising:
   obtaining a current frame image input through a camera;
   performing scene recognition on the current frame image to obtain a key frame image having a greatest similarity to the current frame image in a global map; and
   obtaining a camera pose of the current frame image based on the key frame image,
   wherein the obtaining of the camera pose of the current frame image based on the key frame image comprises obtaining a feature point matching relationship between the current frame image and the key frame image, and obtaining the camera pose of the current frame image based on the feature point matching relationship between the current frame image and the key frame image, and
   wherein the obtaining of the feature point matching relationship between the current frame image and the key frame image comprises obtaining a local three-dimensional point cloud of the current frame image and a global three-dimensional point cloud of the key frame image,
   wherein the obtaining of the local three-dimensional point cloud of the current frame image comprises:
   obtaining a two-dimensional feature point and a depth value of the current frame image; and
   converting the two-dimensional feature point and the depth value of the current frame image into the local three-dimensional point cloud of the current frame image based on a pose prior.

2. The method of claim 1, wherein the performing of the scene recognition on the current frame image comprises:

obtaining a global descriptor of the current frame image; and inquiring the key frame image having the greatest similarity to the current frame image in the global map based on the global descriptor of the current frame image.

3. The method of claim 2, wherein the inquiring of the key frame image having the greatest similarity to the current frame image in the global map based on the global descriptor of the current frame image comprises:

obtaining a distance between a global descriptor of each key frame in the global map and the global descriptor of the current frame image; and obtaining a similarity between the global descriptor of the key frame image and the global descriptor of the current frame image based on the distance between the global descriptor of the key frame image and the global descriptor of the current frame image, wherein, as the distance between the global descriptor of the key frame image and the global descriptor of the current frame image decreases, the similarity between the key frame image and the current frame image increases.

4. The method of claim 2, wherein the obtaining of the global descriptor of the current frame image comprises:

obtaining the global descriptor of the current frame image through an intersection over union (IOU)-based image depth feature extraction network.

5. The method of claim 4, further comprising:

performing training on the IOU-based image depth feature extraction network, wherein the training of the IOU-based image depth feature extraction network comprises:

obtaining an anchor point image and a positive sample image from a training image; and performing training on the IOU-based image depth feature extraction network based on the anchor point image, the positive sample image, and a degree of similarity between the anchor point image and the positive sample image.

6. The method of claim 5, wherein the obtaining of the anchor point image and the positive sample image from the training image comprises:

performing random sampling to obtain the anchor point image from the training image;

performing random sampling to obtain the degree of similarity between the anchor point image and the positive sample image; and performing sampling for an image in which a degree of similarity to the anchor point image is the obtained degree of similarity between the anchor point image and the positive sample image as the positive sample image.

7. The method of claim 5, wherein the degree of similarity between the anchor point image and the positive sample image is an IOU score.

8. The method of claim 5, after obtaining the anchor point image and the positive sample image from the training image, the method further comprising:

performing projective transformation on one or more of the anchor point image and the positive sample image.

9. The method of claim 1, wherein the obtaining of the feature point matching relationship between the current frame image and the key frame image further comprises:

obtaining a scene structure of the current frame image and a scene structure of the key frame image based on the local three-dimensional point cloud of the current frame image and the global three-dimensional point cloud of the key frame image; and obtaining the feature point matching relationship between the current frame image and the key frame image based on the scene structure of the current frame image and the scene structure of the key frame image.

10. The method of claim 9, wherein the obtaining of the global three-dimensional point cloud of the key frame image comprises:

converting a two-dimensional feature point and a depth value of the key frame image into the global three-dimensional point cloud based on a camera pose of the key frame image.

11. The method of claim 10, wherein the obtaining of the feature point matching relationship between the current frame image and the key frame image based on the scene structure of the current frame image and the key frame image comprises:

performing encoding on each of the local three-dimensional point cloud and the global three-dimensional point cloud based on a three-dimensional position encoder to obtain a local high-dimensional feature and a global high-dimensional feature;

obtaining a feature point descriptor of the current frame image and a feature point descriptor of the key frame image; and inputting the local high-dimensional feature and the global high-dimensional feature and the feature point descriptor of the current frame image and the feature point descriptor of the key frame image to a feature point matching network to obtain the feature point matching relationship between the current frame image and the key frame image.

12. The method of claim 1, wherein the obtaining of the camera pose of the current frame image based on the feature point matching relationship between the current frame image and the key frame image comprises:

obtaining the camera pose of the current frame image based on a local beam adjustment method or a global beam adjustment method, based on the feature point matching relationship between the current frame image and the key frame image.

13. A method for simultaneous localization and mapping (SLAM), the method comprising:

obtaining a current frame image input through a camera;

obtaining a key frame image having a greatest similarity to the current frame image;

obtaining a feature point matching relationship between the current frame image and the key frame image; and obtaining a camera pose of the current frame image based on the feature point matching relationship between the current frame image and the key frame image, wherein the obtaining of the feature point matching relationship between the current frame image and the key frame image comprises obtaining a local three-dimensional point cloud of the current frame image and a global three-dimensional point cloud of the key frame image, wherein the obtaining of the global three-dimensional point cloud of the key frame image comprises converting a two-dimensional feature point and a depth value of the key frame image into the global three-dimensional point cloud based on a camera pose of the key frame image.

14. The method of claim 13, wherein the obtaining of the feature point matching relationship between the current frame image and the key frame image further comprises:

obtaining a scene structure of the current frame image and a scene structure of the key frame image based on the local three-dimensional point cloud of the current frame image and the global three-dimensional point cloud of the key frame image; and obtaining the feature point matching relationship between the current frame image and the key frame image based on the scene structure of the current frame image and the key frame image.

15. A device for simultaneous localization and mapping (SLAM), the device comprising at least one processor configured to:

obtain a current frame image input through a camera;

perform scene recognition on the current frame image to obtain a key frame image having a greatest similarity to the current frame image in a global map; and obtain a camera pose of the current frame image based on the key frame image, wherein the obtaining of the camera pose of the current frame image based on the key frame image comprises obtaining a feature point matching relationship between the current frame image and the key frame image, and obtaining the camera pose of the current frame image based on the feature point matching relationship between the current frame image and the key frame image, and wherein the obtaining of the feature point matching relationship between the current frame image and the key frame image comprises obtaining a local three-dimensional point cloud of the current frame image and a global three-dimensional point cloud of the key frame image, and wherein the obtaining of the local three-dimensional point cloud of the current frame image comprises:

obtaining a two-dimensional feature point and a depth value of the current frame image; and converting the two-dimensional feature point and the depth value of the current frame image into the local three-dimensional point cloud of the current frame image based on a pose prior.

16. A device for simultaneous localization and mapping (SLAM), the device comprising at least one processor configured to:

obtain a current frame image input through a camera;

obtain a key frame image having a greatest similarity to the current frame image;

obtain a feature point matching relationship between the current frame image and the key frame image; and obtain a camera pose of the current frame image based on the feature point matching relationship between the current frame image and the key frame image that comprises obtaining a local three-dimensional point cloud of the current frame image and a global three-dimensional point cloud of the key frame image, wherein the obtaining of the global three-dimensional point cloud of the key frame image comprises converting a two-dimensional feature point and a depth value of the key frame image into the global three-dimensional point cloud based on a camera pose of the key frame image.

17. A non-transitory computer-readable storage medium storing a computer program thereon, wherein, when the computer program is executed by a processor to implement the method for SLAM according to claim 1.

18. A computing device comprising:

at least one processor; and at least one memory configured to store a computer program, wherein, the computer program is executed by the at least one processor to implement the method for simultaneous localization and mapping (SLAM) according to claim 1.

* * * * *